(12) United States Patent
Jansen et al.

(10) Patent No.: US 12,186,981 B2
(45) Date of Patent: Jan. 7, 2025

(54) METHODS AND COMPOSITIONS FOR FORMING THREE-DIMENSIONAL OBJECTS BY ADDITIVE FABRICATION

(71) Applicant: Stratasys, Inc., Eden Prairie, MN (US)

(72) Inventors: Johan Franz Gradus Antonius Jansen, Echt (NL); Rudolfus Antonius Theodorus Maria Van Benthem, Echt (NL); Paulus Franciscus Anna Buijsen, Echt (NL); Franciscus Johannes Marie Derks, Echt (NL); Mark Petrus Franciscus Pepels, Echt (NL); Alfred Jean Paul Buckmann, Echt (NL)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 18/359,767

(22) Filed: Jul. 26, 2023

(65) Prior Publication Data

US 2023/0373159 A1    Nov. 23, 2023

Related U.S. Application Data

(62) Division of application No. 16/318,763, filed as application No. PCT/EP2017/068524 on Jul. 21, 2017, now Pat. No. 11,724,447.

(30) Foreign Application Priority Data

Jul. 22, 2016   (EP) ..................... 16180915
Oct. 28, 2016   (EP) ..................... 16196328
Apr. 21, 2017   (EP) ..................... 17167544

(51) Int. Cl.
| | |
|---|---|
| *B29C 64/165* | (2017.01) |
| *B29C 64/291* | (2017.01) |
| *B29C 64/393* | (2017.01) |
| *B33Y 10/00* | (2015.01) |
| *B33Y 70/00* | (2020.01) |
| *C08F 2/48* | (2006.01) |
| *C08F 216/12* | (2006.01) |
| *C08F 220/18* | (2006.01) |
| *C08F 290/06* | (2006.01) |

(Continued)

(52) U.S. Cl.
CPC .......... *B29C 64/165* (2017.08); *B29C 64/291* (2017.08); *B29C 64/393* (2017.08); *B33Y 10/00* (2014.12); *B33Y 70/00* (2014.12); *C08F 2/48* (2013.01); *C08F 216/125* (2013.01); *C08F 220/1811* (2020.02); *C08F 290/06* (2013.01); *C08F 290/061* (2013.01); *C08G 18/227* (2013.01); *C08G 18/3206* (2013.01); *C08G 18/4211* (2013.01); *C08G 18/672* (2013.01); *C08G 18/73* (2013.01); *C08G 18/755* (2013.01); *C08G 18/8016* (2013.01); *C08K 3/013* (2018.01); *C08K 5/14* (2013.01); *C08K 5/17* (2013.01); *C08L 67/06* (2013.01); *C08L 75/02* (2013.01); *C08L 75/14* (2013.01); *B33Y 50/02* (2014.12)

(58) Field of Classification Search
CPC ......... B33Y 70/00; B33Y 10/00; B33Y 50/02; B29C 64/165; B29C 64/291; B29C 64/393; C08K 5/14; C08K 3/013; C08K 5/17; C04B 35/14; C08F 2/48; C08F 216/125; C08F 220/1811; C08F 290/06; C08F 290/061; C08G 18/227; C08G 18/3206; C08G 18/42; C08G 18/4211; C08G 18/672; C08G 18/73; C08G 18/755; C08G 18/8016; C08L 67/06; C08L 75/02; C08L 75/14
See application file for complete search history.

(56) References Cited

U.S. PATENT DOCUMENTS

| | | |
|---|---|---|
| 5,204,055 A | 4/1993 | Sachs et al. |
| 7,381,360 B2 | 6/2008 | Oriakhi et al. |

(Continued)

FOREIGN PATENT DOCUMENTS

| | | |
|---|---|---|
| CN | 1503721 A | 6/2004 |
| WO | 03/16030 A1 | 2/2003 |

OTHER PUBLICATIONS

International Preliminary Report on Patentability received for PCT Patent Application No. PCT/EP2017/068524, mailed on Jan. 31, 2019, 7 pages.
International Search Report and Written Opinion received for PCT Patent Application No. PCT/EP2017/068524, mailed on Oct. 24, 2017, 8 pages.

*Primary Examiner* — Philip C Tucker
*Assistant Examiner* — Jimmy R Smith, Jr.
(74) *Attorney, Agent, or Firm* — Faegre Drinker Biddle & Reath LLP

(57) ABSTRACT

A method of forming a three-dimensional object comprises the steps of forming a layer of a particulate composition, selectively depositing a liquid composition onto the layer of the particulate composition in accordance with computer data corresponding to the shape of at least a portion of a three-dimensional object, and repeating the steps a plurality of times to form a three-dimensional object. The particulate composition comprises a plurality of first particles that comprise a resin component comprising a first resin, the first resin comprising a first resin polymerizable group. Either or both of the particulate composition and the liquid composition comprise an initiator capable of initiating polymerization of at least the first resin. At least the first resin undergoes melting and polymerization in a plurality of the locations where the liquid composition has been selectively deposited.

20 Claims, 2 Drawing Sheets

(51) Int. Cl.

| | | |
|---|---|---|
| *C08G 18/22* | (2006.01) | |
| *C08G 18/32* | (2006.01) | |
| *C08G 18/42* | (2006.01) | |
| *C08G 18/67* | (2006.01) | |
| *C08G 18/73* | (2006.01) | |
| *C08G 18/75* | (2006.01) | |
| *C08G 18/80* | (2006.01) | |
| *C08K 3/013* | (2018.01) | |
| *C08K 5/14* | (2006.01) | |
| *C08K 5/17* | (2006.01) | |
| *C08L 67/06* | (2006.01) | |
| *C08L 75/02* | (2006.01) | |
| *C08L 75/14* | (2006.01) | |
| *B33Y 50/02* | (2015.01) | |

(56) References Cited

U.S. PATENT DOCUMENTS

| | | |
|---|---|---|
| 2004/0036200 A1 | 2/2004 | Patel et al. |
| 2005/0093194 A1 | 5/2005 | Oriakhi et al. |
| 2008/0188583 A1 | 8/2008 | Attenburrow et al. |
| 2011/0262637 A1 | 10/2011 | Jansen et al. |
| 2012/0231232 A1 | 9/2012 | Xu et al. |
| 2019/0030800 A1* | 1/2019 | Rudisill ................ B33Y 10/00 |
| 2019/0240901 A1 | 8/2019 | Jansen et al. |

* cited by examiner

METHODS AND COMPOSITIONS FOR FORMING THREE-DIMENSIONAL OBJECTS BY ADDITIVE FABRICATION

CROSS-REFERENCE TO RELATED APPLICATIONS

This application is divisional of U.S. application Ser. No. 16/318,763, filed Jan. 18, 2019, which is a U.S. National Phase of International Application No. PCT/EP2017/068524, filed Jul. 21, 2017, which designated the EP and claims priority to and the benefit of EP Application Nos. 16180915.7, filed Jul. 22, 2016; 16196328.5, filed Oct. 28, 2016; and 17167544.0, filed Apr. 21, 2017. The entirety of the contents of each of these applications are hereby incorporated by reference as if fully set forth herein.

FIELD

The invention relates to a method of forming three-dimensional objects by additive fabrication, to compositions and kits of materials that may be useful for forming three-dimensional objects by additive fabrication, and to three-dimensional objects formed by additive fabrication.

BACKGROUND

Additive fabrication, also known as three-dimensional printing, is a technique for forming three-dimensional objects by building up objects one portion at a time until a final three-dimensional object is produced. Additive techniques can be contrasted with subtractive techniques, such as milling, wherein portions of material are removed from a larger amount of material to produce the final three-dimensional object.

One known additive fabrication technique is disclosed in U.S. Pat. No. 5,204,055. In this technique, a layer of a powder material is formed. A liquid binder is then deposited onto a layer of a powder material in selected regions in accordance with computer data corresponding to the shape of at least a portion of a three-dimensional object. The liquid binder causes the powder material to become bonded in the selected regions. The steps of forming layers of powder material and depositing the liquid binder in selected regions of the layer of powder material are repeated a selected number of times to produce a three-dimensional object. The powder may be solid or porous and may be a ceramic, metallic, or plastic material.

Further techniques based on the process of U.S. Pat. No. 5,204,055 have focused on the chemical reaction involved in curing the binder material, and in some cases have involved chemical reactions of the powder material itself. For example, US20040036200 mentions a system wherein the powder substantially comprises a first reactive component and the liquid binder includes a second active component, the second active component being capable of either reacting with the first reactive component or facilitating the first reactive component to react with itself.

A further such system is described in U.S. Pat. No. 7,381,360. In such a system, a particulate composition is utilized as the powder material. The particulate composition contains polymeric particulates, a polymerization initiator, and optionally other particulate components. The liquid binder comprises polymerizable monomers and a polymerization accelerator. The polymerization accelerator is typically present to react with the polymerization initiator of the particulate composition.

Despite these advances, there is a need for further and alternative methods for forming three-dimensional objects by additive fabrication.

SUMMARY

In accordance with an embodiment of the invention, a method of forming a three-dimensional object comprises the steps of:

a. forming a layer of a particulate composition, the particulate composition comprising a plurality of first particles that comprise a resin component, the resin component comprising a first resin that is crystalline or semi-crystalline, the first resin comprising a first resin polymerizable group, wherein the layer of particulate composition has a dry temperature, the dry temperature being the temperature at the surface of the layer of the particulate composition;

b. selectively depositing a liquid composition onto the layer of the particulate composition in accordance with computer data corresponding to the shape of at least a portion of a three-dimensional object, wherein at least one of the particulate composition or the liquid composition comprises an initiator capable of initiating the polymerization of at least the first resin, and wherein at least one melting temperature of the first resin is less when the particulate composition is in contact with the liquid composition than when the particulate composition is not in contact with the liquid composition;

c. applying electromagnetic radiation to a plurality of the locations of the layer of the particulate composition where the liquid composition has been selectively deposited, wherein the particulate composition undergoes melting in a plurality of the locations where the liquid composition has been selectively deposited and while undergoing melting or while molten the initiator initiates polymerization of at least the first resin; and d. repeating steps a-c a plurality of times to form a three-dimensional object.

In accordance with another embodiment of the invention, a kit of materials for forming an object by an additive fabrication process comprises:

a. a particulate composition comprising a plurality of first particles that comprise a resin component, the resin component comprising a first resin that is crystalline or semi-crystalline, the first resin comprising a first resin polymerizable group; and b. a liquid composition;

wherein at at least one temperature, the first resin, the resin component, all crystalline or semi-crystalline resins in the particulate composition, all resins in the particulate composition, the first particles, or the particulate composition do not undergo melting in absence of the liquid composition, but do undergo melting when the particulate composition is in contact with the liquid composition, and wherein at least one of the particulate composition or the liquid composition comprises an initiator capable of initiating the polymerization of at least the first resin.

In an embodiment, the liquid composition further comprises an absorber, the absorber being able to absorb electromagnetic radiation.

DETAILED DESCRIPTION

Figure 1:
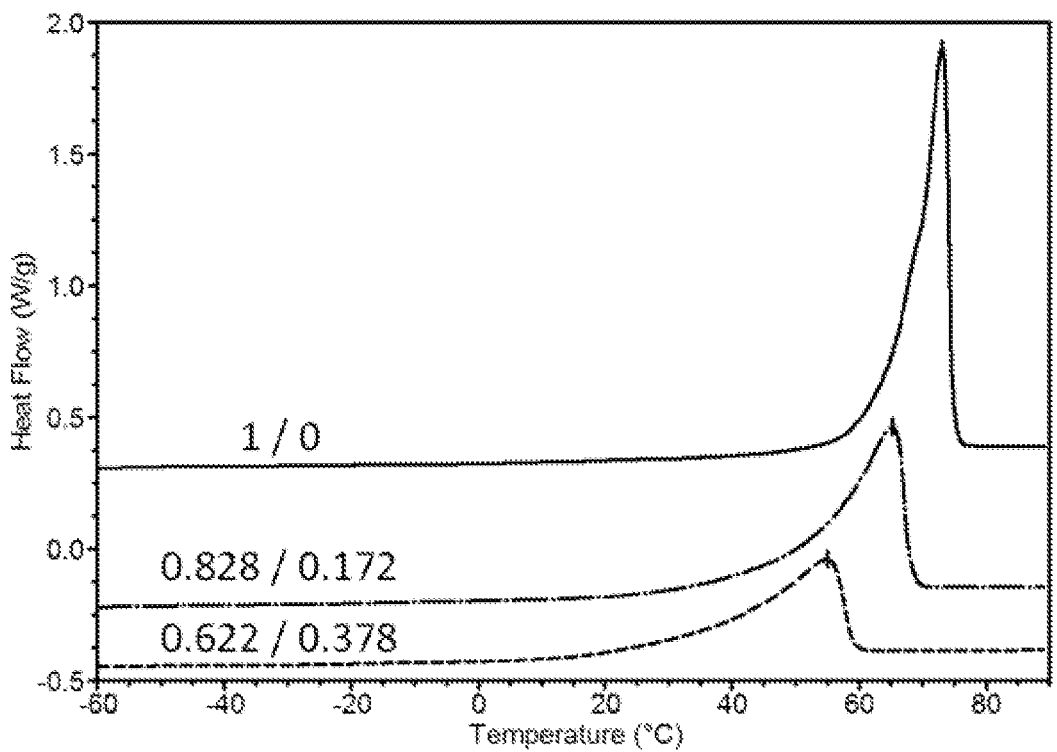
FIG. 1 is a graph of DSC results associated with Example 1.

Generally, a layer of a three-dimensional object may be formed by a process comprising the steps of forming a layer of a particulate composition and selectively depositing a liquid composition onto the layer of the particulate composition in accordance with computer data corresponding to the shape of at least a portion of a three-dimensional object. The process can be repeated additional times to form further layers, eventually building up the desired three-dimensional object. Post treatment steps, such as treatment with temperature or light, may also be present.

In accordance with an embodiment of the invention, a method of forming a three-dimensional object comprises the steps of:
a. forming a layer of a particulate composition, the particulate composition comprising a plurality of first particles that comprise a resin component, the resin component comprising a first resin that is crystalline or semi-crystalline, the first resin comprising a first resin polymerizable group, wherein the layer of particulate composition has a dry temperature, the dry temperature being the temperature at the surface of the layer of the particulate composition;
b. selectively depositing a liquid composition onto the layer of the particulate composition in accordance with computer data corresponding to the shape of at least a portion of a three-dimensional object, wherein at least one of the particulate composition or the liquid composition comprises an initiator capable of initiating the polymerization of at least the first resin, and wherein at least one melting temperature of the first resin is less when the particulate composition is in contact with the liquid composition than when the particulate composition is not in contact with the liquid composition;
c. applying electromagnetic radiation to a plurality of the locations of the layer of the particulate composition where the liquid composition has been selectively deposited, wherein the particulate composition undergoes melting in a plurality of the locations where the liquid composition has been selectively deposited and while undergoing melting or while molten the initiator initiates polymerization of at least the first resin; and
d. repeating steps a-c a plurality of times to form a three-dimensional object.

In accordance with another embodiment of the invention, a kit of materials for forming an object by an additive fabrication process comprises:
a. a particulate composition comprising a plurality of first particles that comprise a resin component, the resin component comprising a first resin that is crystalline or semi-crystalline, the first resin comprising a first resin polymerizable group; and
b. a liquid composition;
wherein at least one temperature, the first resin, the resin component, all crystalline or semi-crystalline resins in the particulate composition, all resins in the particulate composition, the first particles, or the particulate composition do not undergo melting in absence of the liquid composition, but do undergo melting when the particulate composition is in contact with the liquid composition, and
wherein at least one of the particulate composition or the liquid composition comprises an initiator capable of initiating the polymerization of at least the first resin.

The step of forming a layer of a particulate composition can be formed by simply smoothing a quantity of a particulate composition into a sufficiently level plane. The plane has a surface, which is the interface of the particulate composition and a gas, such as air or nitrogen, or the equivalent location if under vacuum. The powder is flowable, in other words not melted, when forming a layer of particulate composition. This can be done, for example, by smoothing the top plane of a large quantity of particulate composition, or pushing a layer of particulate composition across a previously cured layer of the desired three-dimensional object being formed. The step of forming a layer of a particulate composition can be performed by use of a doctor blade or a roller. In another process, the particulate composition could be dispensed onto a substrate in order to form a layer of the particulate composition. After steps a-c have been carried out once, subsequent layers of particulate composition can be formed adjacent to a previously cured layer of the three-dimensional object.

The particulate composition has a dry temperature, the dry temperature being the temperature at the surface of the layer of the particulate composition. The temperature at the surface is the temperature prior to contacting the particulate composition and the liquid composition. The dry temperature is typically the environment temperature of the additive fabrication process. In an embodiment, the average temperature of the air or other gas, such as nitrogen, at the surface of the particulate composition is equal to the dry temperature. The dry temperature may be maintained using appropriate heating, cooling, or ventilation devices.

After forming a layer of the particulate composition, a liquid composition is selectively deposited onto the layer of the particulate composition in accordance with computer data corresponding to the shape of at least a portion of a three-dimensional object. In an embodiment, the liquid composition comprises a first liquid polymerizable component, and the first liquid polymerizable component comprises a first liquid polymerizable group.

The liquid composition may be selectively deposited at an amount of at least 1 wt %, 5 wt %, 10 wt %, 15 wt %, 20 wt %, 25 wt %, 30 wt %, 35 wt %, or 40 wt % of liquid composition per voxel, based on the total weight of the particulate composition and the liquid composition per voxel. The liquid composition may be selectively deposited at an amount of at most 90 wt %, 80 wt %, 75 wt %, 70 wt %, 65 wt %, or 60 wt % of liquid composition per voxel, based on the total weight of the particulate composition and the liquid composition per voxel.

Throughout this patent application, melting temperature is defined as the peak temperature of a melting peak in a DSC thermogram. Melting temperature is synonymous with melting point.

A melting enthalpy associated with a melting temperature is determined as follows. A melting enthalpy is assigned to each melting temperature by defining the minimum melting enthalpies between each melting temperature, and then assigning the total melting enthalpy between the minimums to the melting temperature that falls between those two minimums. The sum of the melting enthalpy assigned to each melting temperature equals the total melting enthalpy of the DSC thermogram.

At least the first resin is crystalline or semi-crystalline. In an embodiment, the melting temperature(s) at least the first resin is/are reduced when contacted with the liquid composition. In an embodiment, the melting temperature(s) of one or more components of the particulate composition, such as the first resin or resin component or all resins in the particulate composition or first particles, or the melting temperature(s) of the particulate composition as a whole, is/are reduced when contacted with the liquid composition. The reduction in melting temperature(s) is responsible for or facilitates melting of the particulate composition. In an embodiment, the first resin, the resin component, all crystalline or semi-crystalline resins in the particulate composition, all resins in the particulate composition, the first particles, or the particle composition undergoes melting after being contacted with the liquid composition.

In an embodiment, the particulate composition undergoes an enthalpy fraction averaged melting temperature depression (EFAMTD) of at least 10° C. when contacted with the liquid composition. The method of calculation of the enthalpy fraction averaged melting temperature depression is described below. The enthalpy fraction averaged melting temperature depression is a measure of the change of the melting temperature(s) of the particulate composition when the particulate composition is not in contact with the liquid composition and when the particulate composition and the liquid composition are in contact. In an embodiment, the particulate composition undergoes an enthalpy fraction averaged melting temperature depression is at least 15° C., at least 20° C., at least 25° C., at least 30° C., at least 35° C., at least 40° C., at least 45° C., or at least 50° C. when contacted with the liquid composition. In an embodiment, the particulate composition undergoes an enthalpy fraction averaged melting temperature depression is at most 140° C., at most 120° C., or at most 110° C. when contacted with the liquid composition.

In an embodiment, the particulate composition, the first particles, the resin component, all crystalline or semi-crystalline resins in the particulate composition, all resins in the particulate composition, all resins in the first particles, or the first resin may have one melting temperature, two melting temperatures, three melting temperatures, four melting temperatures, or more than four melting temperatures, such as less than two melting temperatures or two or more melting temperatures. In an embodiment, all melting temperatures in the first resin, resin component, first particles, or particulate composition are at least 30, at least 40, at least 50, or at least 60° C.

The dry temperature may be selected such that the first resin, resin component, first particles, all crystalline or semi-crystalline resins in the particulate composition, all resins in the particulate composition, or the particulate composition undergoes melting after the liquid composition contacts the particulate composition, but the particulate composition does not melt in the absence of the liquid composition. After the liquid composition is in contact with the particulate composition, the particulate composition may undergo melting at the dry temperature or a lesser temperature (i.e. at or below the dry temperature), or may undergo melting at a temperature higher than the dry temperature that is achieved by applying electromagnetic radiation to a plurality of the locations of the layer of the particulate composition where the liquid composition has been selectively deposited. Complete melting is usually not instantaneous; melting may continue for several hours after the particulate composition is first contacted with the liquid composition.

In some embodiments, melting only occurs after applying electromagnetic radiation to a plurality of the locations of the layer of the particulate composition where the liquid composition has been selectively deposited. The electromagnetic radiation is absorbed at a plurality of the locations where the liquid composition has been selectively deposited, such that the temperature is raised above the dry temperature at those locations. In an embodiment, the liquid composition comprises an absorber. The absorber absorbs electromagnetic radiation such that the temperature is increased at a plurality of locations where the absorber is selectively deposited.

In some embodiments, the particulate composition undergoes melting regardless of whether electromagnetic radiation is applied or not because at the dry temperature the particulate composition does not undergo melting when the particulate composition is not in contact with the liquid composition, but does undergo melting when the particulate composition is in contact with the liquid composition. Electromagnetic radiation may still be applied to, for instance, increase the temperature above the dry temperature at a plurality of the locations where the liquid composition was selectively deposited. In an embodiment, the three-dimensional object is held at the dry temperature for a period sufficient for the first resin, the resin component, all crystalline or semi-crystalline resins in the particulate composition, all resins in the particulate composition, the first particles, or the particulate composition to undergo melting prior to removing the three-dimensional object from a bed of particulate composition.

Unless stated otherwise, "undergoes melting", such as "the particulate composition undergoes melting", as well as "undergo melting", "undergoing melting", and like terms, are defined as that the local temperature has at least temporarily reached the point where the total enthalpy of the melting points in the first resin that are greater than the local temperature divided by the total enthalpy of the melting points in the first resin that are less than or equal to the local temperature is less than 1. In an embodiment, "undergoes melting" as well as "undergo melting" and "undergoing melting", and like terms, are defined as that the local temperature has at least temporarily reached the point where the total enthalpy of the melting points in the first resin that are greater than the local temperature divided by the total enthalpy of the melting points in the first resin that are less than or equal to the local temperature is less than 0.75, less than 0.5, less than 0.25, less than 0.1, or 0. In embodiments, the definition of "undergoes melting" is based on the resin component, first particles, all crystalline or semi-crystalline resins in the particulate composition, all resins in the particulate composition, or the particulate composition.

In an embodiment, the local temperature and melting point(s) of the first resin, the resin component, first particles, all crystalline or semi-crystalline resins in the particulate composition, all resins in the particulate composition, or the particulate composition, as applicable, is such that the local temperature is sufficient for the first resin, the resin component, first particles, all crystalline or semi-crystalline resins in the particulate composition, all resins in the particulate composition, or the particulate composition, as applicable, to be undergoing melting for the entire time that the particulate composition is in contact with the liquid composition. This is because the melting point(s) of at least the first resin, but also, in embodiments, the resin component, first particles, all crystalline or semi-crystalline resins in the particulate composition, all resins in the particulate composition, and/or the particulate composition, as applicable, is/are reduced when the liquid composition contacts the particulate composition, as explained above.

"While molten" means that the first resin, the resin component, first particles, all crystalline or semi-crystalline resins in the particulate composition, all resins in the particulate composition, or the particulate composition, as applicable, has/have undergone melting such that the resin component, first particles, all crystalline or semi-crystalline resins in the particulate composition, all resins in the particulate composition, or the particulate composition, as applicable is/are in the melted state. In an embodiment, the dry temperature is maintained at a temperature that is less than the lowest melting temperature of the first resin, the resin component, all crystalline or semi-crystalline resins in the particulate composition, all resins in the particulate composition, the first particles, or the particulate composition, when the particulate composition is not in contact with the liquid composition and greater than at least the lowest melting temperature of the first resin, the resin component, all crystalline or semi-crystalline resins in the particulate composition, all resins in the particulate composition, the first particles, or the particulate composition, when the particulate composition is in contact with the liquid composition.

In an embodiment, the dry temperature is maintained at a temperature that is less than the lowest temperature at which the first resin, the resin component, all crystalline or semi-crystalline resins in the particulate composition, all resins in the particulate composition, the first particles, or the particulate composition undergoes melting, when the particulate composition is not in contact with the liquid composition and greater than the lowest temperature at which the first resin, the resin component, all crystalline or semi-crystalline resins in the particulate composition, all resins in the particulate composition, the first particles, or the particulate composition undergoes melting, when the particulate composition is in contact with the liquid composition.

In an embodiment, the dry temperature is maintained at a temperature that is less the lowest melting temperature of the first resin, the resin component, all crystalline or semi-crystalline resins in the particulate composition, all resins in the particulate composition, the first particles, or the particulate composition, when the particulate composition is not in contact with the liquid composition and greater than at least the temperature at which the first resin, the resin component, all crystalline or semi-crystalline resins in the particulate composition, all resins in the particulate composition, the first particles, or the particulate composition undergoes melting, when the particulate composition is in contact with the liquid composition.

In an embodiment, after selectively depositing the liquid composition, electromagnetic radiation is applied to a plurality of the locations of the layer of the particulate composition where the liquid composition has been selectively deposited. In an embodiment, after selectively depositing the liquid composition, electromagnetic radiation is applied to substantially all of the locations of the layer of the particulate composition where the liquid composition has been selectively deposited. In an embodiment, after selectively depositing the liquid composition, electromagnetic radiation is applied to all of the locations of the layer of the particulate composition where the liquid composition has been selectively deposited. The electromagnetic radiation may comprise, for instance, heat, such as infrared radiation, or light, such as visible or UVA radiation. In an embodiment, the electromagnetic radiation comprises infrared light. In an embodiment, the electromagnetic radiation comprises UV light. In an embodiment, the electromagnetic radiation comprises electromagnetic radiation having a wavelength of from 340 to 460 nm. In an embodiment, the electromagnetic radiation comprises electromagnetic radiation having a wavelength of from 700 to 1500 nm.

The electromagnetic radiation may be applied using any suitable apparatus such as a lamp, a laser, or LEDs. The electromagnetic radiation may be applied to the entire layer of the particulate composition, to only those parts of the particulate composition where liquid composition was selectively deposited, or some combination of the two.

In an embodiment, the electromagnetic radiation causes the local temperature at the surface of the layer at a plurality of the locations of the surface where the particulate composition is in contact with the liquid composition to be raised above the dry temperature. In an embodiment, the electromagnetic radiation causes the local temperature at the surface of the layer at substantially all locations of the surface where the particulate composition is in contact with the liquid composition to be raised above the dry temperature. In an embodiment, the electromagnetic radiation causes the local temperature at the surface of the layer at all locations of the surface where the particulate composition is in contact with the liquid composition to be raised above the dry temperature. In this case, the electromagnetic radiation is thermal energy or an exothermic chemical reaction initiated by application of electromagnetic radiation raises the local temperature. In an embodiment, the electromagnetic is not selectively applied and an absorber facilitates the increase in local temperature of the layer. In an embodiment, the electromagnetic is selectively applied and an absorber facilitates the increase in local temperature of the layer. In an embodiment, the increase in local temperature is caused by an exothermic chemical reaction.

In an embodiment, the local temperature at the surface of the layer at a plurality of the locations of the surface where the particulate composition is in contact with the liquid composition is greater than the lowest melting temperature of the first resin, the resin component, all crystalline or semi-crystalline resins in the particulate composition, all resins in the particulate composition, the first particles, or the particulate composition when the particulate composition is in contact with the liquid composition, and the local temperature at the surface of the particulate composition at the locations of the surface where the particulate composition is not in contact with the liquid composition is less than the lowest melting temperature of the first resin, the resin component, all crystalline or semi-crystalline resins in the particulate composition, all resins in the particulate composition, the first particles, or the particulate composition when the particulate composition is not in contact with the liquid composition. In an embodiment, the local temperature at the surface of the layer at a plurality of the locations of the surface where the particulate composition is in contact with the liquid composition is sufficient for the first resin, the resin component, all crystalline or semi-crystalline resins in the particulate composition, all resins in the particulate composition, the first particles, or the particulate composition to undergo melting when the particulate composition is in contact with the liquid composition, and the local temperature at the surface of the particulate composition at the locations of the surface where the particulate composition is not in contact with the liquid composition is not sufficient for the first resin, the resin component, all crystalline or semi-crystalline resins in the particulate composition, all resins in the particulate composition, the first particles, or the particulate composition to undergo melting when the particulate composition is not in contact with the liquid composition. In an embodiment, a plurality of the locations of the surface of a layer or a layer means substantially all locations. In an embodiment, a plurality of the locations of the surface of a layer or a layer means all locations.

In an embodiment, the electromagnetic radiation activates the initiator. In an embodiment, the initiator is a photo-initiator and the electromagnetic radiation is UV light. In an embodiment, the initiator is a photo-initiator and the electromagnetic radiation is visible light. In an embodiment, the initiator is a thermal-initiator and the electromagnetic radiation is infrared light. The initiator initiates polymerization of at least the first resin in a plurality of the locations where the liquid composition was selectively deposited.

In an embodiment, the particulate composition undergoes melting in a plurality of the locations where the liquid composition has been selectively deposited and while undergoing melting or while molten the initiator initiates polymerization of at least the first resin, the resin component, all crystalline or semi-crystalline resins in the particulate composition, all resins in the particulate composition, the first particles, or the particulate composition. The degree to which the first resin, the resin component, all crystalline or semi-crystalline resins in the particulate composition, all resins in the particulate composition, the first particles, or the particulate composition undergo melting may determine the final properties of the article. For instance, a first resin, resin component, all crystalline or semi-crystalline resins in the particulate composition, all resins in the particulate composition, first particles, or particulate composition that is completely molten at the time of polymerization may have differing property isotropy or mechanical properties than one where the local temperature has briefly reached the point where the total enthalpy of the melting points in the first resin, the resin component, all crystalline or semi-crystalline resins in the particulate composition, all resins in the particulate composition, the first particles, or the particulate composition that are greater than the local temperature divided by the total enthalpy of the melting points in the first resin, the resin component, all crystalline or semi-crystalline resins in the particulate composition, all resins in the particulate composition, the first particles, or the particulate composition that are less than or equal to the local temperature is less than 1. The steps of the method of forming a three-dimensional object are repeated additional times, thereby forming numerous layers in accordance with the shape of a three-dimensional object. The polymerization reaction for an individual layer may be substantially complete before forming the next layer of particulate composition, or may have only begun.

In an embodiment, after depositing the liquid composition on the particulate composition, the particulate composition undergoes melting due to melting point(s) in the first resin, the resin component, all crystalline or semi-crystalline resins in the particulate composition, all resins in the particulate composition, the first particles, or the particulate composition having been depressed as a result of the particulate composition coming into contact with the liquid composition and the dry temperature being above sufficient melting point(s). Subsequently, electromagnetic radiation is applied to activate the initiator, thereby initiating polymerization. The onset of polymerization causes the layer to begin hardening. Further layers of the three-dimensional object are built accordingly.

In an embodiment, after depositing the liquid composition on the particulate composition, the melting point(s) in the first resin, the resin component, all crystalline or semi-crystalline resins in the particulate composition, all resins in the particulate composition, the first particles, or the particulate composition are depressed as a result of the particulate composition coming into contact with the liquid composition, but the first resin, the resin component, all crystalline or semi-crystalline resins in the particulate composition, all resins in the particulate composition, the first particles, or the particulate composition, as applicable, does not initially undergo melting because the dry temperature is below sufficient melting point(s). Subsequently, electromagnetic radiation is applied to both increase the local temperature to the point that the first resin, the resin component, all crystalline or semi-crystalline resins in the particulate composition, all resins in the particulate composition, the first particles, or the particulate composition undergoes melting, and to activate the initiator, thereby initiating polymerization. The onset of polymerization causes the layer to begin hardening. Further layers of the three-dimensional object are built accordingly.

After repeating the steps of forming a layer of the particulate composition, selectively depositing the liquid composition, and applying the electromagnetic radiation a plurality of times according to the disclosure herein, the particulate composition will have undergone melting in a plurality of the locations where the liquid composition was in contact with the particulate composition. At the time that the method is completed, sufficient melting and polymerization may have occurred such that the three-dimensional object may be immediately removed from the unmelted particulate composition, or a waiting period may be advantageous where the three-dimensional object is held at a temperature, for example the dry temperature, for a period of time to allow the particulate composition to further undergo melting and/or polymerization in the desired locations. After sufficient melting and polymerization, the three-dimensional object is removed from the particulate composition, preferably after cooling the particulate composition below the dry temperature to allow for easier and safer handling of the three-dimensional object. In an embodiment, the three-dimensional article is cooled below the lowest Tg of the first resin, the resin component, all crystalline or semi-crystalline resins in the particulate composition, all resins in the particulate composition, the first particles, or the particulate composition. Means may be used to remove loose particulate composition from the three-dimensional object, such as brushing or forced air.

The three-dimensional object may be further subjected to post-curing. In an embodiment, the three-dimensional object is post-cured by applying electromagnetic radiation to the three-dimensional object. In an embodiment, the electromagnetic radiation comprises infrared radiation. In an embodiment, the electromagnetic radiation comprises ultraviolet radiation. In an embodiment, the post-cure comprises a thermal post-cure. In an embodiment, the post-cure comprises a thermal post-cure at the dry temperature. In an embodiment, the post-cure comprises a thermal post-cure at a temperature that is higher than the dry temperature. In an embodiment, the post-cure comprises a thermal post-cure at a temperature that is higher than the dry temperature but less than the highest melting temperature in the particulate composition. In an embodiment, the post-cure comprises a thermal post-cure at a temperature that is greater than or equal to the highest melting temperature in the particulate composition. In an embodiment, the post-cure comprises a thermal post-cure at a temperature that is higher than all melting temperatures of the first resin, all resins in the particulate composition, the first particles, or the particulate composition when the particulate composition is not in contact with the liquid composition. In an embodiment, the post-cure lasts for at least 15, 30, 45, 60, 75, 90, 105, or 120 minutes.

In an embodiment, the post-cure comprises a post-cure at a temperature that is higher than the dry temperature and higher than at least one melting temperature of the first resin, the resin component, all crystalline or semi-crystalline resins in the particulate composition, all resins in the particulate composition, the first particles, or the particulate composition when the particulate composition is in contact with the liquid composition, the at least one melting temperature being higher than the dry temperature. In an embodiment, the post-cure comprises a post-cure at a temperature that is higher than the dry temperature and greater than or equal to the activation temperature of a thermal initiator.

The components of the particulate composition and liquid composition, and further optional components, and further aspects of the methods and kits of materials, are discussed further below.

Particulate Composition

The particulate composition may comprise one or more different kinds of particles, for instance, particles having different chemical makeup. A plurality of the particles are first particles that comprise a resin component, a thermal radical initiator dispersed or dissolved in the resin component, and a retardant dispersed or dissolved in the resin component. Such first particles are typically present at an amount of from 40 to 100 wt % of the particulate composition, for example from 50 wt % to 99 wt % of the particulate composition.

Additional potential components of the particulate composition are flow modifiers, non-reactive fillers, stabilizers, or further additives such as colorants. In an embodiment, the particulate composition comprises a colorant and the colorant comprises a pigment or a dye.

In an embodiment, the particulate composition comprises a flow modifier. Suitable flow modifiers are fumed silicon dioxide, precipitated silicon dioxide, fumed aluminum oxide, talc, or fumed titanium dioxide. The flow modifier can be simply mixed in with the other elements of the particulate composition. In an embodiment, the particulate composition comprises from 0.05 to 5 wt % of flow modifier, based on the total weight of the particulate composition.

In an embodiment, the particulate composition comprises a plurality of particles that are filler. Such fillers may be organic or inorganic. In an embodiment, the filler is non-reactive with the other components of the particulate composition and the liquid composition. In an embodiment, the filler is reactive with at least one other component of the particulate composition or a component in the liquid composition. In the case that an organic filler comprises reactive groups, the organic filler has a Mn divided by the average number of polymerizable groups per molecule of greater than 3000 g/mol and all resins in the particulate composition have a Mn divided by the average number of polymerizable groups per molecule of less than 3000 g/mol.

In an embodiment, all resins in the particulate composition have a Mn divided by the average number of polymerizable groups per molecule of less than 3000 g/mol.

In an embodiment, the particulate composition further comprises a plurality of particles of silicon dioxide, titanium dioxide, calcium carbonate, magnesium carbonate, barium sulphate, calcium sulphate, zeolite, graphite, carbon black, carbon fiber, carbon nanotubes, alumina, or alumina hydrate. In an embodiment, the particulate composition further comprises a plurality of metal particles.

In an embodiment, the particulate composition comprises an organic filler, such as polyurethane particles, polystyrene particles, poly(methyl methacrylate) particles, polycarbonate particles, or core-shell particles. In an embodiment, the organic filler comprises an impact modifier. Examples of impact modifiers are elastomer particles. In an embodiment, the impact modifying components, which can be dispersed into the composition, are elastomers based on copolymers of ethylene or propylene and one or more $C_2$ to $C_{12}$ α-olefin monomers.

Examples of such are ethylene/propylene copolymers or ethylene/propylene copolymers, optionally containing a third copolymerizable diene monomer (EPDM), such as 1,4-hexadiene, dicyclopentadiene, di-cyclooctadiene, methylene norbornene, ethylidene norbornene and tetrahydroindene; ethylene/α-olefin copolymers, such as ethylene-octene copolymers and ethylene/α-olefin/polyene copolymers.

In an embodiment, the particulate filler comprises polybutadiene, polyisoprene, styrene/butadiene random copolymer, styrene/isoprene random copolymer, acrylic rubbers (e.g. polybutylacrylate), poly(hexamethylene carbonate).

Elastomer particles may be prepared by a variety of means, including by isolation from a latex made via emulsion polymerization. The average size of these elastomer particles is preferably between about 10 nm and about 10 μm. In an embodiment, the average size of the elastomer particles if from 10 nm to 1 μm.

Optionally, a shell may be present on the particles that can be introduced, e.g., via grafting or during a second stage of emulsion polymerization. Examples of such particles are core-shell impact modifier particles that contain a rubber core and a glassy shell. Examples of core materials are polybutadiene, polyisoprene, acrylic rubber (e.g. polybutylacrylate rubber), styrene/butadiene random copolymer, styrene/isoprene random copolymer, or polysiloxane. Examples of shell materials or graft copolymers are (co)polymers of vinyl aromatic compounds (e.g. styrene) and vinyl cyanides (e.g. acrylonitrile) or (meth)acrylates (e.g. MMA).

Commercially available products of these core-shell type elastomer particles are Resinous Bond RKB (dispersions of core-shell particles in epoxy manufactured by Resinous Chemical Industries Co., Ltd.), Durastrength D400, Durastrength 400R (manufactured by Arkema Group), Paraloid EXL-2300 (non-functional shell), Paraloid EXL-2314 (epoxy functional shell), Paraloid EXL-2600, Paraloid EXL-3387 and Paraloid KM-365 (manufactured by Dow), Genioperl P53, Genioperl P23, Genioperl P22 (manufactured by Wacker Chemical), Kane Ace MX products (manufactured by Kaneka), and the like.

Other examples of such elastomer particles are cross-linked polyorganosiloxane rubbers that may include dialkylsiloxane repeating units, where "alkyl" is $C_1$-$C_6$ alkyl. The particles may be modified to include reactive groups, preferably on the surface of the particles.

Examples of polyorganosiloxane elastomer particles that are commercially available are Albidur EP 2240(A), Albidur EP 2640, Albidur VE 3320, Albidur EP 5340, Albidur EP 5640, and Albiflex 296 (dispersions of particles in epoxy or vinyl ether resins, Hanse Chemie, Germany), Genioperl M41C (dispersion in epoxy, Wacker Chemical), Chemisnow MX Series and MP Series (Soken Chemical and Engineering Co.).

Optionally, the filler may be modified to contain reactive groups that (co)polymerize with a component in the particulate composition or the liquid composition. This modification can be introduced by reactive grafting or by copolymerization. Commercial examples of the latter are Lotader random ethylene/acrylate copolymers AX8840 (glycidyl methacrylate/GMA modified), AX8900 and AX8930 (GMA and maleic anhydride modified/MA) produced by Arkema. Optionally, polymerizable groups can be incorporated into the shell of a core-shell particle by copolymerization, such as copolymerization with glycidyl methacrylate, or by treatment of the shell to form reactive functional groups.

In an embodiment, the particulate composition comprises from 1 to 50 wt % of a filler, based on the total weight of the particulate composition. In an embodiment, the particulate composition comprises from 10 to 35 wt % of a filler, based on the total weight of the particulate composition.

In an embodiment, the particulate composition comprises a stabilizer. In an embodiment, the particulate composition comprises a flame retardant, anti-oxidant, hindered amine light stabilizer, and/or UV absorber. The stabilizer may be present as a particulate itself, or dispersed or dissolved in another component, such as in the resin component.

In an embodiment, the particulate composition comprises a plurality of second particles. In an embodiment, the particulate composition further comprises a plurality of second particles that comprise a further resin component that may be the same or different from the resin component of the first particles and is able to (co)polymerizable with the first resin, and optionally a further initiator for initiating polymerization of the further resin component. In an embodiment, the particulate composition further comprises a plurality of second particles that comprise a further resin component that is different from the resin component and not able to (co)polymerizable with the resin component, and optionally a initiator dispersed or dissolved in the further resin component for initiating polymerization of the further resin component.

In an embodiment, the first or second particles further comprise a non-reactive polymer having a number average molecular weight of 1000 to 20,000 g/mol. In an embodiment, the non-reactive polymer is poly(methyl methacrylate), poly(ethyl methacrylate), polyamide, poly(ethylene terephthalate), polyethylene, polypropylene, or copolymers thereof.

Further potential components of the particulate composition are additives such as dyes, pigments for coloration, or pigments for infrared absorption. Such additives may be present as a particulate itself, or dispersed or dissolved in another component, such as in the resin component.

In order to form particles, a premix may be formed that comprises the components of a plurality of the particles making up the particulate composition. For example, a premix may comprise a resin component, a thermal radical initiator, and a retardant. The premix components may be separately weighed and combined in a premixer and a premix formed. A solvent treatment, extrusion, or kneading may be needed to appropriately mix the premix components. For example, the premix may be heated, for example in a kneader or in an extruder, and an extrudate obtained.

The extrudate may then be cooled down until it solidifies, and then ground into particles. The particles may be further ground to reduce the particle size further, followed by appropriate classification based on size to obtain a plurality of particles at the desired particle size.

The mixing temperature, duration of mixing, and retardant content may be chosen so as to avoid significant unwanted polymerization during the preparation of the particles. If the premix is heated in an extruder, it is preferred to use a suitable temperature control in order to avoid reaching a temperature that could lead to curing of the resin component in the extruder.

In an embodiment, the plurality of first particles have a mean particle diameter of from 10 to 100 µm. In an embodiment, the plurality of first particles have a mean particle diameter of from 30 to 80 µm. The elements of the first particles are described further below.

A plurality of the particles are first particles that comprise a resin component. The first particles may comprise a thermal radical initiator dispersed or dissolved in the resin component and a retardant dispersed or dissolved in the resin component.

Resin Component

The first particles comprise a resin component. The resin component may comprise multiple resins, such as a first resin, a second resin, etc. The resin component comprises at least a first resin, the first resin comprising a first resin polymerizable group. In an embodiment, the first resin polymerizable group comprises a carbon-carbon double bond directly attached to an electron withdrawing group. Although only the first resin will be referred to below, the description of the first resin is intended to also describe potential aspects of the optional second or further resin.

In an embodiment, the resin component comprises a polyester, acrylic, polyurethane, epoxy, polyamide, polyesteramide, polycarbonates, polyureas, or a mixture thereof. In an embodiment, the first resin is a polyester, acrylic, polyurethane, epoxy, polyamide, polyesteramide, polycarbonates, polyureas, or a mixture thereof. The first resin may be linear or branched.

The first resin is crystalline or semi-crystalline. Crystalline and semi-crystalline resins differ from amorphous resins in that amorphous resins do not show a melting peak, whereas crystalline and semi-crystalline resins show at least one melting peak. A crystalline or semi-crystalline resin thus comprises at least one melting temperature.

Unless otherwise specified, a stated melting temperature of a component is for the component alone and out of contact with other components. For example, if a melting temperature of a resin is recited without specifying whether the melting temperature of the resin is when the resin is in contact or not in contact with a liquid composition, then the recited melting temperature is the melting temperature of the resin when the resin is not in contact with the liquid composition.

In an embodiment, the first resin has a melting temperature ($T_m$) of at least 30, at least 40, at least 50, or at least 60° C. In an embodiment, the first resin has a melting temperature ($T_m$) of at most 250, at most 200, at most 180, at most 160, at most 140, at most 130, at most 120, or at most 110° C. In an embodiment, the first resin has a melting temperature of from 50 to 120° C. In an embodiment, a crystalline or semi-crystalline resin has a melting enthalpy ($\Delta H_m$) of at least 38, at least 40, at least 50, or at least 60 J/g.

In an embodiment, the first resin has a glass transition temperature ($T_g$) of at least −70, at least −50, at least −40, at least −35, at least −20, at least −10, at least 0, at least 10, or at least 20° C. In an embodiment, the first resin has a glass transition temperature ($T_g$) of at most 120, at most 110, at most 100, at most 90, at most 80, at most 75, at most 70, at most 60, or at most 50° C.

The first resin comprises one or more first resin polymerizable groups. The first resin may comprise multiple polymerizable groups, such as an average of at least two polymerizable groups, at least three, at least four, at least five, or at least six polymerizable groups. In an embodiment, the average number of first resin polymerizable groups in each molecule of the first resin is at least 1, at least 1.5, at least 2, equal to 2, at least 2.01, at least 2.05, at least 2.10, at least 2.12, at least 2.15, at least 2.20, at least 2.30, at least 2.35, or at least 2.40. In an embodiment, the average number of first resin polymerizable groups in each molecule of the first resin is at most 10, at most 9, at most 8, at most 7, at most 6, at most 5, at most 5.5, at most 5, at most 4.5, at most 4, at most 3.80, or at most 3.50.

In an embodiment, the average number of first resin polymerizable groups in each molecule of the first resin is at least 2 and at most 4.5, at least 2 and at most 4, at least 2 and at most 3.5, or at least 2 and at most 3.

In an embodiment, the first resin comprises one or more carbon-carbon double bonds directly attached to an electron withdrawing group. In an embodiment, the first resin polymerizable group consists of a carbon-carbon double bond directly attached to an electron withdrawing group. The first resin may comprise multiple carbon-carbon double bonds directly attached to an electron withdrawing group, such as an average of at least two carbon-carbon double bonds directly attached to an electron withdrawing group, at least three, at least four, at least five, or at least six carbon-carbon double bonds directly attached to an electron withdrawing group. In an embodiment, the average number of carbon-carbon double bonds directly attached to an electron withdrawing group in in each molecule of the first resin is at least 1, at least 1.5, at least 2, equal to 2, at least 2.01, at least 2.05, at least 2.10, at least 2.12, at least 2.15, at least 2.20, at least 2.30, at least 2.35, or at least 2.40. In an embodiment, the average number of carbon-carbon double bonds directly attached to an electron withdrawing group in each molecule of the first resin is at most 10, at most 9, at most 8, at most 7, at most 6, at most 5, at most 5.5, at most 5, at most 4.5, at most 4, at most 3.80, or at most 3.50.

In an embodiment, the average number of carbon-carbon double bonds directly attached to an electron withdrawing group in each molecule of the first resin is at least 2 and at most 4.5, at least 2 and at most 4, at least 2 and at most 3.5, or at least 2 and at most 3.

In an embodiment, the first resin is telechelic. A telechelic resin is a resin comprising at least two reactive endgroups. In an embodiment, the first resin is telechelic and comprises at least two first resin polymerizable groups as endgroups. In an embodiment, the first resin is telechelic and comprises at least two first resin polymerizable groups as endgroups, and the first resin polymerizable groups comprise a (meth)acrylate group. In an embodiment, the first resin is telechelic and comprises at least two first resin polymerizable groups as endgroups, and the first resin polymerizable groups comprise a vinyl ether, vinyl ester, vinyl amine, or vinyl amide group.

In an embodiment, in the particles comprising the resin component, the amount of the resin component is at least 40, at least 50, at least 55, at least 60, at least 65, at least 69, at least 70, or at least 75 wt %, based on the total weight of the first particles. In an embodiment, in the particles comprising the resin component, the amount of the resin component is at most 100, at most 99, at most 95, at most 90, at most 88, at most 85, at most 82, at most 81, or at most 80 wt %, based on the total weight of the first particles. In an embodiment, the amount of the resin component is from 69 to 84 wt %, based on the total weight of the first particles.

In an embodiment, in the particles comprising the resin component, the amount of the first resin is at least 40, at least 50, at least 55, at least 60, at least 65, at least 69, at least 70, or at least 75 wt %, based on the total weight of the resin component. In an embodiment, in the particles comprising the resin component, the amount of the first resin is at most 100, at most 99, at most 95, at most 90, at most 88, at most 85, at most 82, at most 81, or at most 80 wt %, based on the total weight of the resin component. In an embodiment, the amount of the first resin is from 69 to 84 wt %, based on the total weight of the resin component.

In an embodiment, the resin component, has a $M_n$ of at least 800, at least 1000, at least 1500, at least 1800, at least 2000, or at least 2300 Da. In an embodiment, the resin component has a $M_n$ of at most 20000, at most 10000, at most 9000, at most 8000, at most 7000, at most 6000, or at most 5000 Da. In an embodiment, the resin component has a $M_n$ of at least 2000 and at most 8000 Da.

In an embodiment, the first resin, has a $M_n$ of at least 800, at least 1000, at least 1500, at least 1800, at least 2000, or at least 2300 Da. In an embodiment, the first resin has a $M_n$ of at most 20000, at most 10000, at most 9000, at most 8000, at most 7000, at most 6000, or at most 5000 Da. In an embodiment, the first resin has a $M_n$ of at least 2000 and at most 8000 Da.

In an embodiment, the $M_n$ of the resin component divided by the average number of polymerizable groups in each molecule of the resin component is at least 150, at least 180, at least 200, at least 250, at least 300, at least 350, at least 400, at least 450, or at least 500 g/mol. In an embodiment, the $M_n$ of the resin component divided by the average number of polymerizable groups in each molecule of the resin component is at most 2000, at most 1500, at most 1300, at most 1200, at most 1100, at most 1000, at most 900, at most 850, at most 800 g/mol. In an embodiment, the $M_n$ of the resin component divided by the average number of polymerizable groups in each molecule of the resin component is from 450 to 1200 g/mol.

In an embodiment, the $M_n$ of the first resin divided by the average number of first resin polymerizable groups in each molecule of the first resin is at least 150, at least 180, at least 200, at least 250, at least 300, at least 350, at least 400, at least 450, or at least 500 g/mol. In an embodiment, the $M_n$ of the first resin divided by the average number of first resin polymerizable groups in each molecule of the first resin is at most 2000, at most 1500, at most 1300, at most 1200, at most 1100, at most 1000, at most 900, at most 850, at most 800 g/mol. In an embodiment, the $M_n$ of the first resin divided by the average number of first resin polymerizable groups in each molecule of the first resin is from 450 to 1200 g/mol.

In an embodiment, the $M_n$ of the resin component divided by the average number of carbon-carbon double bonds directly attached to an electron withdrawing group in each molecule of the resin component is at least 150, at least 180, at least 200, at least 250, at least 300, at least 350, at least 400, at least 450, or at least 500 g/mol. In an embodiment, the $M_n$ of the resin component divided by the average number of carbon-carbon double bonds directly attached to an electron withdrawing group in each molecule of the resin component is at most 3000, at most 2000, at most 1500, at most 1300, at most 1200, at most 1100, at most 1000, at most 900, at most 850, at most 800 g/mol. In an embodiment, the $M_n$ of the resin component divided by the average number of carbon-carbon double bonds directly attached to an electron withdrawing group in each molecule of the resin component is from 450 to 1200 g/mol.

In an embodiment, the $M_n$ of the first resin divided by the average number of carbon-carbon double bonds directly attached to an electron withdrawing group in each molecule of the first resin is at least 150, at least 180, at least 200, at least 250, at least 300, at least 350, at least 400, at least 450, or at least 500 g/mol. In an embodiment, the $M_n$ of the first resin divided by the average number of carbon-carbon double bonds directly attached to an electron withdrawing group in each molecule of the first resin is at most 2000, at most 1500, at most 1300, at most 1200, at most 1100, at most 1000, at most 900, at most 850, at most 800 g/mol. In an embodiment, the $M_n$ of the first resin divided by the average number of carbon-carbon double bonds directly attached to an electron withdrawing group in each molecule of the first resin is from 450 to 1200 g/mol.

In an embodiment, the resin component comprises a first resin and a second resin, the first resin is crystalline or semi-crystalline and comprises a carbon-carbon double bond directly attached to an electron withdrawing group and the second resin is amorphous and comprises a carbon-carbon double bond directly attached to an electron withdrawing group.

In an embodiment, the first resin has a $M_n$ of at least 2000 and at most 8000 Da. In an embodiment, the first resin has a $M_n$ of at least 2300 and at most 8000 Da.

In an embodiment, the first resin is a polyester, acrylic (polyacrylate), polyurethane, epoxy, polyamide, polyesteramide, polycarbonate, polyurea, or a mixture or copolymer thereof. In an embodiment, the first resin is a polyester, polyurethane, polyamide, or a polyesteramide, or a mixture or copolymer thereof. In an embodiment, the first resin is an unsaturated polyester.

In an embodiment, the first resin is a polyester, such as an unsaturated polyester. Polyesters are generally polycondensation products of polycarboxylic acids and polyols. Examples of polycarboxylic acids are isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid, fumaric acid, maleic acid or anhydride, itaconic acid or anhydride, mesaconic acid, citraconic acid and trimellitic acid. Examples of polyols are aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1, 0]decane (tricyclodecane dimethylol), and 2,3-butenediol.

Trifunctional or more functional alcohols or carboxylic acids can be used to obtain branched polyesters. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid, or dimethylolpropionic acid.

Polyesters can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of amounts of these esterification catalysts used are 0.01-1 wt %, such as 0.1 wt %, based on the total weight of the polyester resin. Crystallinity may be introduced to a polyester by using one or more of the following diacids: succinic acid, adipic acid, sebacic acid or dodecanedioc acid, and/or one or more of the following diols: ethyleneglycol, hexanediol, butanediol, in the synthesis of the polyester.

In an embodiment, the first resin is an acrylic, also known as a polyacrylate. Generally, an acrylic is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxyl functionality, the acrylic resin contains a hydroxyl functional (meth)acrylic acid [by the term "(meth)acrylic" is meant herein "methacrylic or acrylic"], preferably in combination with alkyl esters of (meth)acrylic acid. Examples of hydroxyl functional (meth)acrylic acid esters include hydroxyethyl(meth)acrylate, and hydroxypropyl(meth)acrylate, etc. To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality. The introduction of ethylenic unsaturations to an acrylic resin may be carried out by reacting the hydroxyl and/or glycidyl moieties on the acrylic resin with an unsaturated organic acid such as acrylic acid, methacrylic acid, 2-butenedioic acid, (meth)acrylic anhydride, and (meth)acryloylchloride.

In an embodiment, the first resin is a polyurethane. Polyurethanes can for example be prepared using customary, generally known polyaddition reaction of a (poly)isocyanate with a (poly)alcohol in the presence of, if needed a catalyst and other additives. For example, if needed, customary catalysts such as, for example, tertiary amines or organometallic compounds, such as, for example, monobutyltin, tris(2-ethylhexanoate), tetrabutyl titanate or dibutyl tin dilaurate can be used. Examples of the (poly)alcohols that may be used in the preparation of polyurethanes are the same as those that can be used in the preparation of a polyester. The (poly)alcohol may be a polyester polyol, a polyesteramide polyol, a polyether polyol, a polythioether polyol, a polycarbonate polyol, a polyacetal polyol, a polyvinyl polyol, a polysiloxane polyol, or an acrylic polyol. Suitable polyester polyols include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, bisphenol A derivatives, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydrides or dimethyl terephthalate. Polyesters obtained by the polymerisation of lactones, for example caprolactone, in conjunction with a polyol may also be used. Polyesteramides may be obtained by the inclusion of amino-alcohols, such as ethanolamine, in polyesterification mixtures. Examples of isocyanates that may be used in the preparation of polyurethanes include isophorone diisocyanate, hexane diisocyanate, 1,4-diisocyanatocyclohexane, naphthalene diisocyanate, 4,4'-diphenylmethane diisocyanate, 2,2'-Methylenediphenyl diisocyanate, hexamethylene diisocyanate, 2,4-toluene diisocyanate, 2,6-toluene diisocyanate, hexamethylene-1,6-diisocyanate, tetramethylene-1,4-diisocyanate, dicyclohexylmethane-4,4-diisocyanate, 1,4-benzene diisocyanate, 3,3'-diethoxy-4,4-diphenyl diisocyanate, m-phenylene diisocyanate, polymethylene polyphenyl diisocyanate, 2,4,6-triisopropyl-m-phenylene diisocyanate, 2,4,4-trimethylhexane-1,6 diisocyanate, and mixtures thereof. The introduction of ethylenic unsaturations to a polyurethane resin may be carried out by reacting an isocyanate moieties on the polyurethane resin with an unsaturated hydroxyl functional ester such as hydroxyl propyl methacrylate or hydroxyl ethyl acrylate or hydroxyl ethyl methacrylate; alternatively the introduction of ethylenic unsaturations to a polyurethane resin may be carried out by reacting the hydroxyl moieties on the polyurethane with an unsaturated organic acid such as acrylic acid, methacrylic acid, 2-butenedioic acid.

In an embodiment, the first resin is an epoxy. Epoxies may for example be prepared from phenolic compounds in combination with epichlorohydrins. In an embodiment, the epoxy is a bisphenol A diglycidyl ether, such as is commercially available as Epikote™ 1001, or a Novolac epoxide. The introduction of first resin polymerizable groups to an epoxy may be carried out by reacting the epoxy moieties on the epoxy with an unsaturated organic acid, such as acrylic acid, methacrylic acid, or 2-butenedioic acid.

In an embodiment, the first resin is a polyamide, a polyimide, or a polyamide-imide. In an embodiment, the first resin is a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, dimerfatty diamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as, for example, di-ethylene-triamine or di-hexamethylene-triamine; di-alkylene-tetramines or di-alkylene-pentamines; acids, for example 1,3,5-benzene tricarboxylic acid or trimellitic anhydride; and poly-functional amino acids, such as, for example, aspartic acid or glutamic acid. The introduction of polymerizable groups may be carried out by reacting the carboxyl moieties on a polyamide resin with an unsaturated organic alcohol, such as hydroxyethylacrylate.

In an embodiment, the first resin is a polyesteramide. Polyesteramides are resins comprising both ester bonds (as in a polyester) and amide bonds (as in a polyamide). Polyesteramides may for example be prepared from mono-, di-, tri- or polyfunctional monomers, such as monomers with carboxylic acid functionality, monomers with hydroxyl functionality, monomers with amine functionality and/or monomers having a combination of any of these functionalities. The introduction of polymerizable groups may be carried out by reacting the carboxyl moieties on a polyesteramide resin with an unsaturated organic alcohol, such as hydroxyethyl(meth)acrylate.

In an embodiment, the first resin is a polycarbonate. The introduction of polymerizable groups to a polycarbonate may be carried out by reacting the hydroxyl moieties on the polycarbonate with an unsaturated organic acid such as acrylic acid, methacrylic acid, or 2-butenedioic acid.

In an embodiment, the first resin is a polyurea. Polyureas can, for example, be prepared using customary, generally known polyaddition reactions of a (poly)isocyanate with a (poly)amine in the presence of, if needed, a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes. Alternatively, polyureas can for example also be prepared using customary, generally known polycondensation reactions of a (poly)urethane with a polyamine. Suitable (poly)amines for the preparation of polyureas include those as are exemplified above for the polyamides. Suitable (poly)urethanes for the preparation of polyureas include isophoron di(m)ethylurethane, 1,6-hexane di(m)ethylurethane, 1,12-dodecylenedi(m)ethylurethane, dicyclohexylmethane-4,4-di(m)ethylurethane, and can for example be prepared from the reaction of a polyamine with di(m) ethylcarbonate. The introduction of ethylenic unsaturations to a polyurea may be, for example, carried out by reacting the amine and/or isocyanate moieties in the polyurea with an unsaturated organic acid such as (meth)acrylic acid or reacting an isocyanate moiety with an unsaturated hydroxyl functional ester such as hydroxyl propyl methacrylate, hydroxyl ethyl acrylate or hydroxyl ethyl methacrylate, or hydroxyl functional acrylamide such as hydroxyethylacrylamide.

The first resin polymerizable groups may be present in the backbone of the first resin and/or pendant to the backbone of the first resin and/or at the terminus of the first resin. In an embodiment, the first resin polymerizable group comprises an acrylate, methacrylate, fumarate, maleate, itaconate, citraconate, or mesaconate. Acrylates, methacrylates, fumarates, maleates, itaconates, citraconates, and mesaconates are polymerizable groups derived from acrylic acid, methacrylic acid, fumaric acid, maleic acid or anhydride, itaconic acid or anhydride, citraconic acid, and mesaconic acid, respectively.

A second or further resin (third, fourth, etc.) may be the same or different as the first resin. A second or further resin polymerizable group (third, fourth, etc.) may be the same or different as the first resin polymerizable group. Thus, although various aspects above are described relating to the first resin or first resin polymerizable group, the description is also intended to disclose the various aspects for further resins or resin polymerizable groups, such as a second resin, second resin polymerizable group, third resin, third resin polymerizable group, etc. Combinations of the various aspects of first resins and second resins are thus also intended to be disclosed.

In addition to the first resin polymerizable group, further resin polymerizable groups (e.g. a second resin polymerizable group) may be present. In an embodiment, the resin component comprises a second resin, the second resin comprising a second resin polymerizable group, the second resin polymerizable group comprising a carbon-carbon double bond that is able to (co)polymerize with the first resin polymerizable group. In an embodiment, further resin polymerizable groups may comprise carbon-carbon double bonds directly attached to an electron donating group.

In an embodiment, the resin component comprises a first resin, the first resin comprising a first resin polymerizable group, the first resin polymerizable group comprising a carbon-carbon double bond directly attached to an electron withdrawing group, and a second resin comprising a second resin polymerizable group, the second resin polymerizable group comprising a carbon-carbon double bond directly attached to an electron donating group. In an embodiment, the second resin polymerizable group comprises a vinyl ether. In an embodiment, the second resin comprises a mono vinyl ether or a di vinyl ether. In an embodiment, the second resin comprises a urethane (meth)acrylate.

In an embodiment, the resin component comprises a vinyl functionalized urethane resin or a vinyl functionalized urea resin. A vinyl functionalized urethane resin is a urethane resin comprising vinyl groups. A vinyl functionalized urea resin is a urea resin comprising vinyl groups. In an embodiment, the vinyl functionalized urethane resin is a vinyl ether polyurethane resin or a vinyl ester polyurethane resin. In an embodiment, the vinyl functionalized urea resin is a vinyl ether polyurea resin or a vinyl ester polyurea resin. In an embodiment, the vinyl functionalized urethane resin or vinyl functionalized urea resin is crystalline or semi-crystalline. In an embodiment, the vinyl functionalized urethane resin or vinyl functionalized urea resin is amorphous. In an embodiment, the vinyl functionalized urethane resin is a vinylether polyester urethane. In an embodiment, the vinyl functionalized urea resin is a vinylether polyester urea. The polyester part of a vinylether polyester urethane or urea is generally a polycondensation product of polyalcohols and polycarboxylic acids In order to prepare a vinyl functionalized urethane resin, an isocyanate may be reacted with a hydroxyfunctional vinylether and/or a polyalcohol. To prepare a vinylether polyester urethane, an isocyanate may be reacted with a hydroxyfunctional vinylether and a hydroxyfunctional polyester (for example a polyester as described above). The reactions may be performed in the presence of, if needed, a catalyst and other additives. Vinyl ester polyurethane or polyurea resins may be formed by a transvinylation process.

In an embodiment, the second resin is a vinyletherpolyester. Vinyletherpolyesters can, for example, be prepared from acid functional polyesters with hydroxyl functional vinylethers. It is also possible to prepare vinyletherpolyesters via transesterification of hydroxyfunctional or alkylfunctional polyesters with hydroxyfunctional vinylethers.

In an embodiment, the second resin is polymerizable, but is not able to copolymerize with the first resin. In an embodiment, the second resin polymerizable group comprises an epoxy. In an embodiment, the first resin polymerizable group is a (meth)acrylate and the second resin polymerizable group comprises an epoxy.

Liquid Composition

The liquid composition may be selectively deposited onto a layer of the particulate composition using any suitable process, such as spraying, jetting, for instance by piezo, thermal, or bubble inkjet, or depositing over a mask or stencil. In an embodiment, the liquid polymerizable group is devoid of polymerizable components. In an embodiment, the liquid polymerizable group is devoid of polymerizable components and consists of components having a molecular weight of below 200 g/mol. In an embodiment, the liquid composition comprises water, such as deionized water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol. In an embodiment, the liquid composition comprises at least 50 wt % of water, such as deionized water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, ethylene glycol, or propylene glycol, or a combination thereof. In an embodiment, the liquid composition consists of one or more of water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol.

In an embodiment, the liquid composition comprises at least a first liquid polymerizable component comprising a first liquid polymerizable group. In an embodiment, the liquid composition comprises an initiator capable of initiating the polymerization of at least the first resin polymerizable group. In an embodiment, the liquid composition comprises an initiator capable of initiating the polymerization of at least the first resin polymerizable group and a liquid polymerizable group.

Optional Liquid Polymerizable Component

In an embodiment, the liquid composition comprises a liquid polymerizable component. The liquid polymerizable component is able to (co)polymerize with the first polymerizable group in the resin component. In an embodiment, the liquid polymerizable component comprises unsaturations as reactive moieties that are (co)polymerizable with the first polymerizable group of the resin. The liquid polymerizable component may comprise one or more liquid polymerizable components, such as a first liquid polymerizable component, a second liquid polymerizable component, etc. When the disclosure below states "the liquid polymerizable component" or the "liquid polymerizable group" it also discloses the first, second, and/or third, etc. liquid polymerizable component or liquid polymerizable group. The liquid polymerizable component may comprise components that are a monomer, oligomer, and/or polymer and components that may be monofunctional or polyfunctional.

The liquid polymerizable component comprises a liquid polymerizable group. In an embodiment, the liquid polymerizable component comprises an acrylate group, a methacrylate group, or a carbon-carbon double bond attached to an electron donating group. In an embodiment, the polymerizable group is a vinyl ester, vinyl ether, vinyl amide, vinyl amine, acrylate, methacrylate, or itaconate. In an embodiment, the polymerizable group is a vinylester, vinylether, vinyl amine, acrylate, or methacrylate. In an embodiment, the liquid polymerizable group comprises a vinyl ether, vinyl ester, or vinyl amine. In an embodiment, the liquid polymerizable group comprises a urethane vinyl ether or urethane vinyl ester.

Exemplary (meth)acrylates include isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, benzyl(meth)acrylate, 4-butylcyclohexyl(meth)acrylate, acryloyl morpholine, (meth)acrylic acid, 2-hydroxyethyl(meth)acrylate, 2-hydroxypropyl(meth)acrylate, 2-hydroxybutyl(meth)acrylate, methyl(meth)acrylate, ethyl(meth)acrylate, propyl (meth)acrylate, isopropyl(meth)acrylate, butyl(meth)acrylate, amyl(meth)acrylate, isobutyl(meth)acrylate, t-butyl (meth)acrylate, pentyl(meth)acrylate, caprolactone acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth) acrylate, isodecyl(meth)acrylate, tridecyl(meth)acrylate, undecyl(meth)acrylate, lauryl(meth)acrylate, stearyl(meth) acrylate, isostearyl(meth)acrylate, tetrahydrofurfuryl(meth) acrylate, butoxyethyl(meth)acrylate, ethoxydiethylene glycol (meth)acrylate, benzyl(meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl(meth)acrylate, methoxypolyethylene glycol (meth)acrylate, methoxypolypropylene glycol (meth)acrylate, diacetone(meth)acrylamide, beta-carboxyethyl(meth)acrylate, phthalic acid(meth) acrylate, dimethylaminoethyl(meth)acrylate, diethylaminoethyl(meth)acrylate, butylcarbamylethyl(meth) acrylate, n-isopropyl (meth)acrylamide fluorinated(meth) acrylate, 7-amino-3,7-dimethyloctyl(meth)acrylate, trimethylolpropane tri(meth)acrylate, pentaerythritol(meth) acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl) oxy]ethyl]-5-ethyl-1,3-dioxan-5-yl]methyl acrylate; 3,9-bis (1,1-dimethyl-2-hydroxyethyl)-2,4,8,10-tetraoxaspiro[5.5] undecane di(meth)acrylate, 1,6-bis-(2-methacryloyloxyethoxycarbonylamino)-2,4,4-trimethyl-hexane (UDMA), dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth) acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, tris(2-hydroxyethyl)isocyanurate tri(meth)acrylate, tris(2-hydroxyethyl)isocyanurate di(meth)acrylate, pentaerythritol tri(meth)acrylate, pentaerythritol tetra(meth) acrylate, dipentaerythritol hexa(meth)acrylate, tricyclodecane diyl dimethyl di(meth)acrylate and alkoxylated versions (e.g., ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy(meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate.

In an embodiment, the liquid polymerizable component comprises an oligomer or polymer. In an embodiment, the liquid polymerizable component comprises an epoxy(meth) acrylate, urethane (meth)acrylate, or polyester(meth)acrylate.

In an embodiment, the liquid polymerizable component is bisphenol A diglycidyl ether di(meth)acrylate, ethoxylated or propoxylated bisphenol A or bisphenol F di(meth)acrylate, dicyclopentadiene dimethanol di(meth)acrylate, [2-[1, 1-dimethyl-2-[(1-oxoallyl)oxy]ethyl]-5-ethyl-1,3-dioxan-5-yl]methyl acrylate, dipentaerythritol monohydroxypenta (meth)acrylate, dipentaerythritol hexa(meth)crylate, propoxylated trimethylolpropane tri(meth)acrylate, propoxylated neopentyl glycol di(meth)acrylate, or a combination thereof.

Exemplary vinyl ethers include but are not limited to mono(alcohol) functionalized vinyl ethers, for example 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether, or 4-(hydroxyl methyl) cyclohexyl methyl vinyl ether (1,4-cyclohexanedimethanol vinyl ether). Further vinyl ethers include di(alcohol functionalized vinyl ethers, for example hexanediol divinylether, 1,4-cyclohexandimethanoldivinylether, butanedioldivinylether, diethyleneglycoldivinylether, or triethyleneglycoldivinylether.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

Exemplary vinyl amines include vinylimidazole, dimethylvinylamine, and N-vinylcarbazole. Exemplary vinyl amides include N-vinylcaprolactam, N-vinylpyrrolidone, and N-vinylformamide.

In an embodiment, the liquid composition comprises a first liquid polymerizable component and a second liquid polymerizable component. In an embodiment, the second liquid polymerizable group comprises an acrylate, methacrylate, fumarate, maleate, or itaconate. In an embodiment, the first liquid polymerizable component comprises a first liquid polymerizable group, and the first liquid polymerizable group comprises a carbon-carbon double bond that is able to (co)polymerize with the first resin polymerizable group and the second liquid polymerizable component comprises a second liquid polymerizable group, and the second liquid polymerizable group comprises a carbon-carbon double bond directly attached to an electron withdrawing group. In an embodiment, the second liquid polymerizable group is able to (co)polymerize with the first liquid polymerizable group. In an embodiment, the second liquid polymerizable group is able to (co)polymerize with a polymerizable group in the resin component, such as a first resin polymerizable group or a second resin polymerizable group. In an embodiment, the first liquid polymerizable group comprises a vinyl ether, and the second liquid polymerizable group comprises a fumarate.

In an embodiment, the liquid composition comprises a first liquid polymerizable component and a second liquid polymerizable component comprising a second liquid polymerizable group and the second liquid polymerizable group is not able to (co)polymerize with the first liquid polymerizable group. In an embodiment, the second liquid polymerizable group comprises an epoxy or an oxetane.

In an embodiment, the liquid polymerizable component in the liquid composition is at least 70, at least 80, at least 90, at least 92, at least 95, at least 96, at least 97, or at least 98 wt %, based on the total weight of the liquid composition. In an embodiment, the amount of the liquid polymerizable component in the liquid composition is at most 99.9, at most 99.5, at most 99, at most 98, or at most 95 wt %, based on the total weight of the liquid composition. In an embodiment, the amount of the liquid polymerizable component is from 95 to 99.9 wt %, based on the total weight of the liquid composition. In an embodiment, the amount of the liquid polymerizable component is from 98 to 99.5 wt %, based on the total weight of the liquid composition.

Initiator

The particulate composition, the liquid composition, or both comprises an initiator capable of initiating the polymerization of at least the first resin. In an embodiment, the particulate composition, the liquid composition, or both comprises an initiator capable of initiating the (co)polymerization of at least the first resin and a liquid polymerizable component. The initiator may be, for example, a thermal radical initiator or a photo-initiator.

In an embodiment, the liquid composition further comprises a liquid radical initiator. In an embodiment, the particulate composition comprises a thermal radical initiator. In an embodiment, the particulate composition comprises a thermal radical initiator that is dispersed or dissolved in a resin component. In an embodiment, the liquid radical initiator comprises a thermal radical initiator or a photo-initiator.

In an embodiment, the initiator is a thermal radical initiator. A thermal radical initiator is a component that generates sufficient radicals to initiate polymerization of the first resin within two hours when the thermal radical initiator is exposed to a temperature greater than or equal to an activation temperature, the activation temperature being greater than 30° C. The activation temperature is thus the lowest temperature at which the thermal radical initiator generates sufficient radicals to initiate polymerization of the first resin within two hours. The activation temperature is greater than the dry temperature. In an embodiment, the activation temperature of the thermal radical initiator is greater than 40° C., 50° C., 60° C., 70° C., 80° C., 90° C., 100° C., 120° C., or 150° C. In an embodiment, the activation temperature of the thermal radical initiator is less than 300° C., 250° C., 200° C., 180° C., 160° C., 140° C., 120° C., 100° C., 80° C., 60° C., or 50° C. The radical may be generated by, for example, decomposition of the thermal radical initiator.

In an embodiment, the thermal radical initiator is dispersed or dissolved in the resin component. The thermal radical initiator can be dispersed or dissolved in the resin by simple mixing with the resin component. For instance, the thermal radical initiator can be dispersed or dissolved in the resin component by mixing a composition comprising the resin, the thermal radical initiator, and the retardant and then forming particles from the composition such that the thermal radical initiator is dispersed or dissolved in the resin component. Merely blending resin component particles with thermal radical initiator particles is not dissolving or dispersing the thermal radical initiator in the resin component. A solvent treatment, extrusion, or kneading may be needed to dissolve or disperse the thermal radical initiator in the resin component.

Examples of thermal radical initiators include, but are not limited to, azo compounds such as, for example, azo isobutyronitrile (AIBN), 1,1'-azobis(cyclohexanenitrile), 1,1'-azobis(2,4,4-trimethylpentane), C—C labile compounds, such as benzopinacole, peroxides, and mixtures thereof In an embodiment, the thermal radical initiator is a peroxide. Possibly suitable peroxides include organic and inorganic peroxides, whether solid or liquid (including peroxides on a carrier); also hydrogen peroxide may be applied.

Examples of suitable peroxides include for example, percarbonates (of the formula —OC(O)O—), peroxyesters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

The thermal radical initiator may for example be a percarbonate, a perester or a peranhydride. Suitable peranhydrides are for example benzoylperoxide (BPO) and lauroyl peroxide (commercially available as Laurox™). Suitable peresters are for instance t-butyl per benzoate and 2-ethyl-hexyl perlaurate. Suitable percarbonates are for example di-t-butylpercarbonate and di-2-ethylhexylpercarbonate or monopercarbonates.

In an embodiment, the thermal radical initiator is an organic peroxide. Examples of suitable organic peroxides are: tertiary alkyl hydroperoxides (such as, for instance, t-butyl hydroperoxide), other hydroperoxides (such as, for instance, cumene hydroperoxide), a ketone peroxide (per-ketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauroyl peroxide, including (di)peroxyesters, perethers (such as, for instance, peroxy diethyl ether). It is of course also possible to use mixtures of peroxides in the particles. Also, the peroxides may be mixed peroxides, i.e. peroxides containing any two different peroxy-bearing moieties in one molecule.

In an embodiment, the thermal radical initiator is a peranhydride, for example benzoyl peroxide or lauroyl peroxide, peroxydicarbonate, for example di(4-t-butylcyclohexyl)-peroxydicarbonate, dicetyl peroxydicarbonate, or dimyristylperoxydicarbonate.

Typically, the reactivity of a peroxide is determined by its half-life. With the exception of hydroperoxides, the half-life is determined by differential scanning calorimetry-thermal activity monitoring (DSC-TAM) of a dilute solution of the initiator in monochlorobenzene. For hydroxperoxides, the half-life is determined titrimetrically in monochlorobenzene. The half-life can be calculated from the following equation (1).

$$t_{1/2} = \ln\frac{2}{k_d} \qquad (1)$$

wherein $t_{1/2}$ is the half-life in second and $k_d$ is the rate constant for the thermal radical initiator dissociation in $s^{-1}$ and is determined by the following equation (2):

$$k_d = A \cdot e^{\frac{-E_a}{RT}} \qquad (2)$$

wherein A is the Arrhenius frequency factor in $s^{-1}$, $E_a$ is the activation energy for the initiator dissociating in J/mole, R is 8.3142 J/mole·K, and T is the temperature in K.

In an embodiment, the temperature at which the thermal radical initiator has a half-life ($t_{1/2}$) of 6 minutes or less is from 50 to 400° C. In an embodiment, the temperature at which the thermal radical initiator has a half-life of 6 minutes or less is 100° C. or higher, 110° C. or higher, 120° C. or higher, 130° C. or higher, 140° C. or higher, or 150° C. or higher. In an embodiment, the temperature at which the thermal radical initiator has a half-life of 6 minutes or less is 70° C. or higher, 80° C. or higher, 90° C. or higher, 100° C. or higher, 110° C. or higher, 120° C. or higher, 130° C. or higher, 140° C. or higher, or 150° C. or higher. In an embodiment, the temperature at which the thermal radical initiator has a half-life of 6 minutes or less is 50° C. or higher, 60° C. or higher, 70° C. or higher, 80° C. or higher, 90° C. or higher, 100° C. or higher, 110° C. or higher, 120° C. or higher, 130° C. or higher, 140° C. or higher, or 150° C. or higher. In an embodiment, the upper limit of the temperature at which the thermal radical initiator has a half-life of 6 minutes or less is 150° C., 175° C., 200° C., 225° C., 250° C., 275° C., 300° C., 325° C., 350° C., 375° C., or 400° C. In an embodiment, the lower limit of temperature at which the thermal radical initiator has a half-life of 6 minutes or less is −20° C., −10° C., 0° C., 10° C., 20° C., 30° C., 40° C., or 50° C. In an embodiment, in the amount of the thermal radical initiator in the first particles is at least 0.1, at least 0.2, at least 0.5, at least 1, at least 2, at least 3, at least 5, or at least 8 wt %, based on the total weight of the first particles. In an embodiment, the amount of the thermal radical initiator in the first particles is at most 30, at most 20, at most 15, at most 10, or at most 8 wt %, based on the total weight of the first particles. In an embodiment, the amount of the thermal radical initiator is from 0.5 to 5 wt %, based on the total weight of the first particles.

In an embodiment, the liquid composition comprises a liquid radical initiator. The term liquid radical initiator is used to refer to a radical initiator in the liquid composition. The liquid radical initiator does not need to be a liquid itself. However, in an embodiment, the liquid radical initiator is a liquid at 30° C. The liquid radical initiator is capable of generating radicals that lead to polymerization of the first resin and/or the liquid polymerizable component. In an embodiment the liquid radical initiator is a thermal radical initiator, as described above.

In an embodiment, the liquid radical initiator is a radical photo-initiator. In an embodiment, the liquid radical initiator is a benzoylphosphine oxide, aryl ketone, benzophenone, hydroxylated ketone, 1-hydroxyphenyl ketone, ketal, metallocene, or a combination thereof.

In an embodiment, the liquid composition comprises a radical photo-initiator comprising 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1,2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis(diethylamino)benzophenone, and 4,4'-bis(N,N'-dimethylamino)benzophenone (Michler's ketone), benzophenone, 4-methyl benzophenone, 2,4,6-trimethyl benzophenone, dimethoxybenzophenone, I-hydroxycyclo-hexyl phenyl ketone, phenyl(1-hydroxyisopropyl)ketone, 2-hydroxy-1-[4-(2-hydroxyethoxy)phenyl]-2-methyl-1-pro-panone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino)benzo-phenone, benzil dimethyl ketal, bis(eta 5-2-4-cyclopenta-dien-1-yl)bis[2,6-difluoro-3-(1H-pyrrol-1-yl)phenyl] titanium, or any combination thereof.

In an embodiment, the liquid composition comprises a radical photo-initiator comprising benzoylphosphine oxides, such as, for example, 2,4,6-trimethylbenzoyl diphenylphos-phine oxide (Lucirin TPO from BASF) and 2,4,6-trimeth-ylbenzoyl phenyl, ethoxy phosphine oxide (Lucirin TPO-L from BASF), bis(2,4,6-trimethylbenzoyl)-phenylphosphin-eoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-mor-pholinyl) phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-ben-zoyl-4'-methyl diphenyl sulphide (Chivacure BMS from Chitec), 4,4'-bis(diethylamino)benzophenone (Chivacure EMK from Chitec), or 4,4'-bis(N,N'-dimethylamino)benzo-phenone (Michler's ketone). Also suitable are mixtures thereof.

Additionally, photosensitizers may be useful in conjunc-tion with radical photo-initiators, depending on the wave-length of electromagnetic radical employed. Examples of suitable photosensitizers include: anthraquinones, such as 2-methylanthraquinone, 2-ethylanthraquinone, 2-tertbuty-lanthraquinone, 1-chloroanthraquinone, and 2-amylanthra-quinone, thioxanthones and xanthones, such as isopropyl thioxanthone, 2-chlorothioxanthone, 2,4-diethylthioxan-thone, and 1-chloro-4-propoxythioxanthone, methyl ben-zoyl formate (Darocur MBF from Ciba), methyl-2-benzoyl benzoate (Chivacure OMB from Chitec), 4-benzoyl-4'-methyl diphenyl sulphide (Chivacure BMS from Chitec), 4,4'-bis(diethylamino)benzophenone (Chivacure EMK from Chitec).

The liquid radical initiator may be present up to about 10 wt % of the liquid composition, in certain embodiments, up to about 6 wt % of the liquid composition, and in further embodiments from about 0.01 wt % to about 5 wt % by weight of the liquid composition, based on the total weight of the liquid composition. In an embodiment, the liquid composition comprises from 0.1 wt % to 4 wt % of a liquid radical initiator, based on the total weight of the liquid composition.

Optional Accelerator

If an accelerator is present, the liquid composition and/or the particulate composition will comprise a thermal radical initiator. When the accelerator comes in contact with a thermal radical initiator, the thermal radical initiator is decomposable at a temperature that is lower than the tem-perature at which the thermal radical initiator is decompos-able in the absence of the accelerator. In an embodiment, an accelerator is present in the liquid composition and a thermal radical initiator is present in the particulate composition. In an embodiment, an accelerator is present in the particulate composition and a thermal radical initiator is present in the liquid composition. In an embodiment, after depositing the liquid composition on the particulate composition, the accel-erator comes into contact with the thermal radical initiator, thereby causing the thermal radical initiator to generate sufficient radicals at a temperature that is lower than the temperature at which the thermal radical initiator is able to generate sufficient radicals in the absence of the accelerator. In an embodiment, the temperature at which a thermal radical initiator is able to generate sufficient radicals in the absence of the accelerator is above the temperature of the particulate composition, whereas the temperature at which the thermal radical initiator is able to generate radicals in the presence of the accelerator is lower than the temperature of the particulate composition.

In an embodiment, the accelerator is an amine, acetoac-etamide, ammonium salt, transition metal compound, or a mixture thereof.

In an embodiment, the accelerator is an amine. In an embodiment, the accelerator is a tertiary amine. In an embodiment, the accelerator is an aromatic tertiary amine comprising an electron donating group directly attached to an aromatic ring. In an embodiment, the accelerator com-prises a β-hydroxy alkyl attached to a tertiary amine. In an embodiment, the accelerator is N,N-dimethylaniline, N,N-diethylaniline, N,N-diisopropanol-para-toluidine, N,N-di-methyl-p-toluidine, N,N-bis(2-hydroxyethyl)xylidine, N,N-dimethylnaphtylamine, N,N-dimethyl toluidine, diisopropanol-p-toluidine, or ethyl N,N-dimethylamino ben-zoate.

In an embodiment, the accelerator is a transition metal compound. Preferably the transition metal has an atomic number of from 21 to 79. Examples of suitable transition metals are those of the following transition metals Sc, Ti, V, Cr, Mn, Fe, Co, Ni, Cu, Zn, Mo, W. In an embodiment, the transition metal is Mn, Fe, Co, or Cu. In an embodiment, the transition metal is Mn, Fe, or Cu. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

In an embodiment, the transition metal compound is a transition metal salt, transition metal complex, or a mixture thereof. In an embodiment, the accelerator is a transition metal organic acid salt or a derivative of a transition metal organic acid salt. Examples of suitable transition metal compounds as accelerators are transition metal carboxylates and transition metal acetoacetates, for example transition metal ethylhexanoate.

Depending on the reactivity of the transition metal compound, the reactivity of the initiation system may be further enhanced using a co-accelerator. In an embodiment, the liquid composition comprises a co-accelerator. In an embodiment, the composition comprises a co-accelerator. The co-accelerator may be in the same composition (liquid or particulate) as the accelerator, or may be in a different composition (liquid or particulate). The co-accelerator may be in the same composition (liquid or particulate) as a thermal initiator, or may be in a different composition (liquid or particulate).

Examples of co-accelerators include 1,3-dioxocompounds, bases and thiol comprising compounds. In an embodiment, a co-accelerator is present in the liquid composition and is a 1,3-dioxo compound. In an embodiment, a co-accelerator is present in the liquid composition and comprises a 1,3-diketone, 1,3-dialdehyde, 1,3-ketoaldehyde, 1,3-ketoester, or a 1,3-ketoamide.

In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at least 10° C., at least 20° C., at least 30° C., at least 40° C., at least 50° C., at least 60° C., at least 70° C., or at least 80° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at most 50° C., at most 60° C., at most 70° C., at most 80° C., at most 90° C., at most 100° C., at most 125° C., at most 150° C., at most 175° C., at most 200° C., at most 225° C., or at most 250° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 200° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 100° C.

In an embodiment, the temperature at which the thermal radical initiator has a half-life of 6 minutes or less when the thermal radical initiator is not in contact with the accelerator is 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 90° C. or less, 80° C. or less, 70° C. or less, 60° C. or less, 50° C. or less, 40° C. or less, or 30° C. or less. In an embodiment, the temperature at which the thermal radical initiator has a half-life of 6 minutes or less when the thermal radical initiator is not in contact with the accelerator is 70° C. or higher, 80° C. or higher, 90° C. or higher, 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 60° C. or less, 50° C. or less, 40° C. or less, or 30° C. or less. In an embodiment, the temperature at which the thermal radical initiator has a half-life of 6 minutes or less when the thermal radical initiator is not in contact with the accelerator is 50° C. or higher, 60° C. or higher, 70° C. or higher, 80° C. or higher, 90° C. or higher, 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 40° C. or less or 30° C. or less. In an embodiment, the temperature at which the thermal radical initiator has a half-life of 6 minutes or less when the thermal radical initiator is in contact with the accelerator is from 20° C. to 50° C.

In an embodiment, the amount of the accelerator in the liquid composition is at least 0.01, at least 0.1, at least 0.2, at least 0.5, at least 1, at least 2, or at least 3 wt %, based on the total weight of the liquid composition. In an embodiment, the amount of the accelerator in the liquid composition is at most 8, at most 6, at most 5, at most 3, or at most 2 wt %, based on the total weight of the liquid composition. In an embodiment, the amount of the accelerator is from 0.1 to 5 wt %, based on the total weight of the liquid composition. In an embodiment, the amount of the accelerator is from 0.5 to 2 wt %, based on the total weight of the liquid composition.

Optional Retardant

In an embodiment, the particulate composition, the liquid composition, or both comprises a retardant. In an embodiment, a retardant inhibits the onset of polymerization of the first resin polymerizable group in response to radicals generated by the initiator. The retardant is typically present in the same composition as an initiator. For instance, in the case that an initiator is present in the liquid component, a retardant may also be present in the liquid component.

In an embodiment, a retardant is dispersed or dissolved in the resin component. The retardant can be dispersed or dissolved in the resin by simple mixing with the resin. For instance, the retardant can be dispersed or dissolved in the resin by mixing a composition comprising the resin, the thermal radical initiator, and the retardant and then forming particles from the composition such that the retardant is dispersed or dissolved in the resin component. Merely blending resin component particles with retardant particles is not dissolving or dispersing the retardant in the resin component. A solvent treatment, extrusion, or kneading may be needed to dissolve or disperse the retardant in the resin component.

In an embodiment, the retardant is a phenolic compound, a stable radical, a catechol, a phenothiazine, a hydroquinone, a benzoquinone, or a mixture thereof.

In an embodiment, the retardant is a phenolic compound. Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

In an embodiment, the retardant is a stable radical. Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl(2,6-di-tert-butyl-$\alpha$-(3,5-di-tert-butyl-4-oxo-2,5-cyclohexadien-1-ylidene)-p-tolyloxy).

In an embodiment, the retardant is a catechol. Examples of catechols include catechol, 4-tert-butylcatechol, and 3,5-di-tert-butylcatechol.

In an embodiment, the retardant is a hydroquinone. Examples of hydroquinones include hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable retardants may for example be chosen from the group of an aluminium-N-nitrosophenyl hydroxylamine, a diethylhydroxylamine and a phenothiazine.

In an embodiment, the retardant comprises hydroquinone, 2-methylhydroquinone, 2-tert-butylhydroquinone, 2,5-di-tert-butylhydroquinone, 2,6-di-tert-butylhydroquinone, 2,6-dimethylhydroquinone, or 2,3,5-trimethylhydroquinone. In an embodiment, the retardant comprises hydroquinone, 2-methylhydroquinone, 2-tert-butylhydroquinone, 2,5-di-tert-butylhydroquinone, 2,6-di-tert-butylhydroquinone, 2,6-dimethylhydroquinone, or a mixture thereof. In an embodiment, the retardant comprises hydroquinone, 2-methylhydroquinone, 2-tert-butylhydroquinone, 2,5-di-tert-butylhydroquinone, 2,6-di-tert-butylhydroquinone, or a mixture thereof. In an embodiment, the retardant comprises 2-methylhydroquinone or 2-tert-butylhydroquinone. Preferably, the amount of retardant in the composition for forming the first particles is at least 0.0001, more preferably is at least 0.0005, even more preferably is at least 0.0010, most preferably is at least 0.0025, especially is at least 0.0050, more especially is at least 0.010, most especially is at least 0.020, for example is at least 0.025, for example is at least 0.030, for example is at least 0.040, for example is at least 0.050, for example is at least 0.060, for example is at least 0.070, for example is at least 0.080, for example is at least 0.100 pph. The amount of retardant in the composition for forming the first particles is preferably at most 10, more preferably at most 5, even more preferably at most 2, most preferably at most 1, especially at most 0.75, more especially at most 0.50, most especially at most 0.25, for example is at most 0.20, for example is at most 0.150, for example is at most 0.125 pph. Preferably, the amount of retardant in the particlulate composition is at least 0.025 and at most 0.125 pph.

Optional Plasticizer

In an embodiment, the liquid composition further comprises a plasticizer. In an embodiment, the plasticizer is a liquid. In an embodiment, the plasticizer is a polyalkylene ether. In an embodiment, the plasticizer is decanol, glycerol, ethylene glycol, diethylene glycol, polyethylene glycol, propylene glycol, or a fatty acid. In an embodiment, the plasticizer is a dialkyl phthalate, such as dioctyl phthalate. In an embodiment, the plasticizer is trimethyl trimellitate, tri-(2-ethylhexyl)trimellitate, tri-(n-octyl,n-decyl)trimellitate, tri-(heptyl,nonyl) trimellitate, n-octyl trimellitate, bis (2-ethylhexyl)adipate, dimethyl adipate, monomethyl adipate, dioctyl adipate, dibutyl sebacate, dibutyl maleate, or diisobutyl maleate. In an embodiment, the amount of plasticizer is less than 25, 20, 15, or 10 wt % of the total liquid composition. In an embodiment, the amount of plasticizer is more than 1, 5, 10, or 20 wt % of the total liquid composition.

Optional Absorber

In an embodiment, the liquid composition or the particulate composition further comprise an absorber. The absorber is able to absorb electromagnetic radiation. In an embodiment, the absorber absorbs one or more of infrared light, near infrared light, and visible light. By including an absorber and carrying out the step of applying electromagnetic radiation to a plurality of the locations of the layer of the particulate composition where the liquid composition has been selectively deposited, a higher temperature may be obtained at the layer of the particulate composition where the absorber is present. The wavelengths that are absorbed by the absorber should overlap with the wavelengths of the electromagnetic radiation.

Attaining a higher temperature may cause the thermal radical initiator to generate more radicals than would be generated in the absence of the absorber. Preferably, the absorber is present in the liquid composition, thereby causing an increased temperature in the areas of the particulate composition on which the absorber is deposited relative to the areas of the particulate composition where the absorber is not deposited.

In an embodiment, the absorber is a pigment, a dye, metallic particles, or carbon black.

In a further optional step, an inhibitor may be deposited on the particulate composition. An inhibitor may be useful to inhibit the curing of the particulate composition and, optionally, the liquid composition. Inhibitors may be, for example, a retardant, a reflector, or a barrier. Suitable retardants are as described above.

A reflector operates to reflect electromagnetic radiation. A reflector may be deposited on the areas of the particulate composition where it is not desired to promote curing. In an embodiment, the reflector is selectively deposited at a location where the liquid composition is not deposited.

Potential reflectors are pigments or dyes, for example metallic inks or silver pigments. A reflective powder or thermal insulator may also be used, such as a ceramic powder. The reflector may be present along with a suitable carrier, such as water or another solvent.

A barrier operates as a barrier between the particulate composition and the liquid composition. Such a material may thus affect the ability of the liquid composition to contact or penetrate the particulate composition. In an embodiment, the barrier is a silicone.

In an embodiment, the liquid composition comprises a colorant and the colorant comprises a pigment or a dye. In this way, the final three-dimensional object may be provided with a visible color.

In an embodiment, the liquid composition comprises a surfactant. A surfactant reduces the surface tension of the liquid composition and thus may be used to improve the wetting of the particulate composition by the liquid composition. Exemplary surfactants are block copolymers of i) silicone and ii)ethyleneoxide and/or propyleneoxide. In an embodiment, the surfactant is a linear block copolymer comprising blocks of i) polydimethylsiloxane and ii) blocks of ethyleneoxide and/or blocks of propyleneoxide. In an embodiment, the surfactant is a polymer comprising a polydimethylsiloxane backbone and pendant groups of blocks of ethyleneoxide and/or blocks of propyleneoxide. Exemplary surfacants are Silwet® products from Momentive™. Further exemplary surfactants are polyacrylates and naphtha/methoxy propanol acetates, such as certain surface additives, air release additives, or wetting or air release additives available from BYK, such as non-silicone wetting or air release additives from BYK. Further exemplary surfactants are fluorosurfactants, suchas Novec FC4430, Novec FC4432, and Zonyl FSO.

In an embodiment, the liquid composition is selectively dispensed onto the layer of the particulate composition in accordance with a plurality of voxels representing a portion of the three-dimensional object. A voxel is a three-dimensional pixel and may have a defined volume. The volume of the voxel may correspond with the resolution of the method of forming a three-dimensional object. For example, a voxel may be defined by the size of a droplet of liquid composition that is selectively dispensed, which will be able to cure a certain depth of a particulate composition. The voxel volume would thus correspond to the area of the droplet multiplied by the size of the depth of the associated particulate composition that would be cured.

In certain embodiments, the molar ratio of various species of polymerizable groups is controlled. In an embodiment, the molar ratio of vinyl ether groups to fumarate and maleate groups per voxel is from 5:1 to 1:5. In an embodiment, the molar ratio of vinyl ether groups to fumarate and maleate groups per voxel is from 1.5:1 to 1:1.5. In an embodiment, the molar ratio of vinyl ether groups to fumarate and maleate groups per voxel is from 1.1:1 to 1:1.1. In an embodiment, the molar ratio of methacrylate groups to vinyl ether groups to fumarate and maleate groups per voxel is from 4.5:2.5:1 to 3.5:1.5:1.

In certain embodiments, the amount of particulate composition and liquid composition may be defined based upon the amount of each present per voxel. In an embodiment, the ratio of weight of the particulate composition to weight of the liquid composition per voxel is from 30:70 to 70:30. In an embodiment, the ratio of weight of the particulate composition to weight of the liquid composition per voxel is from 95:5 to 50:50.

In an embodiment, the thermal radical initiator is a peroxide, the accelerator is present and is an amine, and the molar ratio of peroxide to amine per voxel is 0.1:2, 0.2:1.5, or 0.5:1.1. In an embodiment, the accelerator is present and is a transition metal compound and the amount of transition metal compound is at least 0.01, at least 0.05, at least 0.1 mmol per kg particulate composition plus liquid composition per voxel. In an embodiment, an accelerator is present and is a transition metal compound and the amount of transition metal compound is at most 10, at most 5, or at most 3 mmol per kg of particulate composition plus liquid composition per voxel. In an embodiment, an accelerator is present and is a transition metal compound and the amount of transition metal compound is from 1 to 3 mmol per kg of particulate composition plus liquid composition per voxel.

Further embodiments relate to a kit of materials for forming an object by an additive fabrication process comprising the particulate composition and liquid composition as previously described. Further embodiments relate to three-dimensional objects formed from the methods or the kits of materials as previously described.

Measurement Methods

Unless stated otherwise, any measurements reported or claimed in this patent application are obtained as follows.

Acetone Spot Test (AST)

After storing the formed film at ambient conditions for a few days, a few drops of acetone are deposited on the film and after about 10 seconds the acetone is removed with a cloth. The layers are then assessed by visual inspection. A '+' indicates that the layer is not harmed by the AST. A '+/−' indicates that the top layer is harmed or partially wiped away. A indicates that the layer is completely or nearly completely wiped away.

Dynamic Mechanical Analysis (DMA)

Samples with a width of approximately 2 mm are punched out of the cured films. The thickness is measured with a calibrated Heidenhain thickness meter. The dynamic mechanical analyses are carried out in accordance with ASTM D5026 using a RSA-III test system at a frequency of 1 Hz and over a temperature ranging from −100° C. to 200° C. with a heating rate of 5° C./min. During the measurements, the storage modulus (E'), loss modulus (E") and tangent delta (tan δ) are determined as a function of temperature. "n.t." means not tested.

Acid and hydroxyl values are respectively determined titrimetrically according to ISO 2114-2000 and ISO 4629-1978. NCO value is measured according to ASTM D 2572-97.

Number average molecular weight ($M_n$) is measured by GPC on an Alliance Waters 2695 GPC with two consecutive PL-gel columns, type Mixed-C, l/d=300/7.5 mm (Polymer Laboratories), size of column particles 10 μm, using stabilized tetrahydrofuran (THF) modified with 0.8% acetic acid as the eluent at 1 mL/min at 40° C. and using an Alliance Waters 2414 refractive index detector at 40° C. A set of polystyrene standards with a molecular weight range of from 500 to $7 \times 10^6$ g/mol is used to calibrate the GPC equipment.

The glass transition temperature ($T_g$), melting temperature ($T_m$), crystallization temperature ($T_c$), melting enthalpy ($\Delta H_m$), crystallization enthalpy ($\Delta H_c$), and reaction enthalpy ($\Delta H_r$) measurements are carried out via differential scanning calorimetry (DSC) on a TA instruments DSC Q2000 equipped with a Refrigerated Cooling System 90 in $N_2$ atmosphere and calibrated with indium. The processing of the signal (DSC thermogram, Heat Flow vs. Temperature) is carried out using Universal Analysis 2000 software version 4.5a provided by TA instruments.

The total melting enthalpy for a resin, resin component, first particles, particulate composition, etc. is calculated by summing the melting enthalpies of each melting point of the resin, resin component, first particles, particulate composition, etc.

Mixtures of the desired ratio particulate composition/liquid composition are measured in hermetically sealed pans to avoid evaporation during subsequent runs. The sample should have a target weight of maximum 20 mg. Four heating/cooling runs are performed from −70° C. to [highest melting temperature of particulate composition+10° C.] and back at rates of 5° C./min. Listed melting temperatures correspond to the maxima of the heat flux for the individual melting peaks of the third heating run.

If the endothermic part of the melting enthalpy minus the exothermic part of the melting enthalpy of the second heating run is less than 10% of the total melting enthalpy measured during the first heating run, the following measurement protocol is followed: a fresh sample is heated to (melting temperature of particulate composition+10° C.) at 5° C./min and kept isothermally for 1 minute, after which the sample is cooled down at 5° C./min to room temperature, or if the glass transition temperature is 25° C. or higher, to (glass transition of particulate composition+10° C.). The sample remains at this temperature for a minimum of 3 days. Subsequently, the sample is cooled down to −70° C. and heated to (Melting temperature of particulate composition+ 10° C.) at 5° C./min. The data of this heating run is used.

If significant chemical reactions of the particulate composition or liquid composition takes place in the applied temperature trajectory, effort needs to be taken to inhibit this reaction process. For example, for radical reactions, up to 0.5 wt % on the total composition of inhibitor can be added, without significantly affecting the data.

Calculation of Enthalpy Fraction Averaged Melting Temperature Depression (EFAMTD)

The EFAMTD is calculated according to the following process:

1) Determine the melting temperature(s) of the particulate composition.

A sample of particulate composition (1) is weighed and subjected to DSC as described above, thereby obtaining a particulate composition DSC curve (DSC curve 1). The melting temperature(s), melting enthalpy associated with each melting temperature, and the total melting enthalpy are recorded. If no melting temperature is recorded, then the particulate sample is amorphous and a calculation of EFAMTD is not possible.

2) Determine the possible melting temperature(s) of the liquid composition.

A sample of liquid composition (2) is weighed and subjected to DSC as described above, thereby obtaining a liquid composition DSC curve (DSC curve 2). The melting temperature(s) and melting enthalpy associated with each melting temperature are recorded.

3) After contacting the particulate composition with the liquid composition, determine the melting temperature(s) of the particle composition after dispensing the liquid composition (particulate-liquid sample), melting enthalpy associated with each melting temperature, and the total melting enthalpy.

Two samples of particulate composition are weighed. The liquid composition is dispensed on the particulate composition using a pipet in an amount of from 10 to 20 weight % on the first sample (3a). The liquid composition is dispensed on the particulate composition using a pipet in an amount of from 25 to 40 weight % on the second sample (3b). The weight % of liquid composition is based on the total weight of the composition (particulate composition+liquid composition). The liquid composition should be dispensed to cover as much of the surface of the particulate composition as possible. The particulate-liquid samples 3a and 3b are subjected to DSC as described above. Any melting temperatures that are the result of the liquid composition itself (as determined based on the DSC results obtained from the liquid composition (2) in step 2 (DSC curve 2)) are disregarded, thereby obtaining two particulate-liquid sample DSC curves (DSC curves 3a and 3b). The melting temperature(s) and the melting enthalpy associated with each melting temperature for samples 3a and 3b are determined. The melting enthalpies associated with each remaining melting temperature are summed to obtain the total melting enthalpy for each sample.

4) Select the dataset that will be used to calculate the melting temperature slope(s).

The DSC result from the particulate composition (DSC curve 1) is compared with particulate-liquid DSC curves (DSC curves 3a and 3b). The melting temperature(s) for each DSC curve are compared, starting with the highest melting temperature and working to lower melting temperatures. It is possible that the number of melting temperatures is not equal across all three curves due to a melting peak broadening or combining with another peak, or complete amorphization of one or multiple melting peaks. Accordingly, the method of calculating the melting temperature slope(s) is determined according to the following criteria:

a. If the number of melting temperatures of DSC curves 1, 3a, and 3b are all equal and all greater than 1, then proceed to step 5a. Otherwise, continue to step 4b.
    b. If the number of melting temperatures of each DSC curve of pair [1 and 3a] or of pair [1 and 3b] are equal and greater than 1, but the number of melting temperatures on DSC curve 3a and 3b is not equal, then proceed to step 5b. Otherwise, continue to step 4c.
    c. If all DSC curves show at least one melting temperature, then proceed to step 5c. Otherwise, continue to step 4d.
    d. If DSC curve 1 shows at least one melting temperature, and one of DSC curves 3a and 3b show at least one melting temperature, then proceed to step 5d. Otherwise, the EFAMTD is assumed to be 140° C. and steps 5 and 6 are skipped.

5) Calculate the melting temperature slope(s).

Based on step 4, one of the following methods is used to calculate the melting temperature slope(s).

a. All three DSC curves will be used to calculate the melting temperature slope(s). The number of melting temperature slope(s) will equal the number of melting temperature(s) for each sample. A melting temperature slope is calculated for each pair (set) of melting temperatures, starting from the highest melting temperature. The highest melting temperature of the particulate composition sample (1) is paired with the highest melting temperatures of the particulate-liquid samples (3a and 3b). The melting temperature slope is calculated as follows according to equation (3):

$$(Tm\ \text{slope})_i = 0.5 * \frac{(Tm\ 3a)_i - (Tm\ 1)_i}{\text{Weight Fraction of Liquid Composition 3a}} + 0.5 * \frac{(Tm\ 3b)_i - (Tm\ 1)_i}{\text{Weight Fraction of Liquid Composition 3b}} \quad (3)$$

The next melting temperature slope is then calculated for the next highest set of melting temperatures from the three samples (1, 3a, and 3b), and so on until all melting temperature slopes have been determined. Proceed to step 6.
    b. Only two DSC curves will be used to calculate the melting temperature slope(s). The DSC curve that does not have the same amount of melting temperature(s) as the particulate composition sample (1) is disregarded (either 3a or 3b will be disregarded). The number of melting temperature slope(s) will equal the number of melting temperature(s) for each remaining sample. A melting temperature slope is calculated for each pair (set) of melting temperatures, starting from the highest melting temperature. The highest melting temperature of the particulate composition sample (1) is paired with the highest melting temperature of the particulate-liquid sample (3a or 3b). The Weight Fraction of Liquid Composition 3a or 3b is the weight fraction of liquid composition for the curve that was not disregarded. The melting temperature slope is calculated as follows according to equation (4):

$$(Tm\ \text{slope})_i = \frac{(Tm\ 3a\ \text{or}\ 3b)_i - (Tm\ 1)_i}{\text{Weight Fraction of Liquid Composition 3a or 3b}} \quad (4)$$

The next melting temperature slope is then calculated for the next highest set of melting temperatures from the two samples (1 and either 3a or 3b), and so on until all melting temperature slopes have been determined. Proceed to step 6.

c. All three DSC curves will be used to calculate the melting temperature slope. Only one melting temperature slope will be calculated. The highest melting temperature of the particulate composition sample (1) is paired with the highest melting temperatures of the particulate-liquid samples (3a and 3b). The melting temperature slope is calculated as follows according to equation (5):

$$Tm\ \text{slope} = 0.5 * \frac{(Tm\ 3a) - (Tm\ 1)}{\text{Weight Fraction of Liquid Composition 3a}} + 0.5 * \frac{(Tm\ 3b) - (Tm\ 1)}{\text{Weight Fraction of Liquid Composition 3b}} \quad (5)$$

The EFAMTD is the Tm slope calculated in this step. Skip step 6.

d. Only two DSC curves will be used to calculate the melting temperature slope. The DSC curve that does not show a melting temperature is disregarded (either 3a or 3b will be disregarded). Only one melting temperature slope will be calculated. The highest melting temperature of the particulate composition sample (1) is paired with the highest melting temperature of the particulate-liquid sample (3a or 3b). The Weight Fraction of Liquid Composition 3a or 3b is the weight fraction of liquid composition for the curve that was not disregarded. The melting temperature slope is calculated as follows according to equation (6):

$$Tm\ \text{slope} = \frac{(Tm\ 3a\ \text{or}\ 3b) - (Tm\ 1)}{\text{Weight Fraction of Liquid Composition 3a or 3b}} \quad (6)$$

The EFAMTD is the Tm slope calculated in this step. Skip step 6.

6) Calculate the enthalpy fraction averaged melting temperature depression from the melting temperature slopes.

The melting enthalpy of the particulate composition (step 1) associated with the highest melting temperature [(melting enthalpy)$_1$] is paired with the melting temperature slope calculated from the highest melting temperature [(Tm slope)$_1$], and so on until each recorded melting enthalpy [(melting enthalpy)$_i$] and melting temperature slope [(Tm slope)$_i$] are paired. The total melting enthalpy is the total melting enthalpy of the particulate composition (step 1). The enthalpy fraction averaged melting temperature depression is calculated according to the following equation (7):

$$\text{weight average fractional melting temperature depression} = \sum_{i=1}^{n}\left[(Tm\ \text{slope})_i \times \frac{(\text{melting enthalpy})_i}{\text{total melting enthalpy}}\right] \quad (7)$$

The following examples serve to further elucidate the present inventions, but should in no way be construed as limiting their scope.

EXAMPLES

Some of the various components used in the Examples are described in Table 0.1 and Table 0.2, below. WPU is the weight per unsaturation. WPU is calculated by dividing the weight of the material made by the moles of unsaturations added.

TABLE 0.1

Materials used in the Examples

| Ref | Type | Description | Chemical Name or Commercial Product |
|---|---|---|---|
| P1900 | Resin component | Semi-crystalline divinylether | DSM Uralac ® P1900; NCO < 0.1%; $T_m$ 96-103° C.; WPU 200 g/mol |
| HHHm | Resin component | Crystalline urethane methacrylate | Formed as described below |
| HHHa | Resin component | Crystalline urethane acrylate | Formed as described below |
| HPHm | Resin component | Crystalline urethane acrylate | Formed as described below |
| PU-DEG-Me | Resin component | Semi-crystalline urethane methacrylate | Formed as described below |
| PE-U-ma | Resin component | semi-crystalline polyester methacrylate | Formed as described below |
| DEGDVE | Liquid polymerizable component | Divinyl ether | Di(ethylene glycol) divinyl ether |

TABLE 0.1-continued

Materials used in the Examples

| Ref | Type | Description | Chemical Name or Commercial Product |
|---|---|---|---|
| CHDVE | Liquid polymerizable component | Divinyl ether | 1,4-Cyclohexanedimethanol divinyl ether |
| HBVE | Liquid polymerizable component | Monovinylether | 4-hydroxybutyl vinylether |
| HEMA | Liquid polymerizable component | Methacrylate | 2-hydroxyethyl methacrylate |

TABLE 0.2

Materials used in the Examples

| Ref | Type | Description | Chemical Name or Commercial Product |
|---|---|---|---|
| HEA | Liquid polymerizable component | Acrylate | 2-hydroxyethyl acrylate |
| PEG600-DMA | Liquid polymerizable component | Dimethacrylate | Polyethyleneglycol dimethacrylate MW = 600 |
| NeoRad-U60 | Liquid polymerizable component | Urethane acrylate Mw = 1600 | Product of AGI |
| ACMO | Liquid polymerizable component | Acrylate | Acryloyl morpholine |
| BAPO | Photo-initiator | Free-radical photo-initiator | Phosphine oxide, phenyl bis 2,4,6-trimethyl benzoyl) |
| Trigonox ® C | Thermal Initiator | Free-radical thermal initiator | tBu-peroxybenzoate |
| EtOH | Non-polymerizable liquid | ethanol | ethanol |
| BYK A555 | Surfactant | Silicone-free surfactant | Product of BYK |

Formation of Certain Resin Components

PE-U-ma is formed as follows. A reactor vessel fitted with a thermometer, a stirrer and a distillation device for the removal of water formed during the synthesis, was filled with 1.0 g of tin catalyst, diethyleneglycol (172.4 g) and 1,6-hexanediol (848.9 g). The vessel is heated to 150° C. until the mixture is molten. Terephthalic acid (1100.4 g) and isophthalic acid (194.0 g) are added under a nitrogen flow. The temperature is gradually increased to 260° C. while distilling the reaction water until no water can be collected anymore. The reaction mixture is cooled to 220° C. and a vacuum is applied for 2.5 hours. The resin is then discharged onto an aluminium foil and kept at room temperature. AV=0.7 mg KOH/g and OH=41.2 mg KOH/g. DSC is performed from −50-175° C. with 5° C./min for two runs with a maximum cooling speed ("jump" in program) in between. The data from the second run is taken: Tg=−2.7° C., Tc=21.4° C., and Tm=108.9° C., in which Tc and Tm are the crystallization and melting temperature of the resin. The melting enthalpy is 32.6 J/g.

In a separate stirred reactor under lean air isophorone diisocyanate (80.1 g), dibutyltindilaurate (0.5 g), and 2,6-di-tertiair butyl-p-cresol (0.5 g) are added and through a dropping funnel 2-hydroxyethylmethacrylate (46.9 g) is added over a period of 1.5 hours, making sure that the temperature does not exceed 40° C. The mixture is heated to 40° C. and after 2 hours the NCO % was 11.5. 127.1 g of this isocyanate adduct is transferred to a dropping funnel and kept at a low viscosity by means of heating with an IR-lamp. The resin formed above (500 g) is molten in a reactor at 120° C. and the isocyanate adduct is added over 15 minutes with stirring under lean air. The mixture is left to react for another 40 minutes, after which the NCO % was 0.1 and the material was discharged on an aluminum foil.

PU-DEG-Me is formed as follows. A reactor vessel with stirring equipment is charged with hexamethylene diisocyanate (HDI, 1 molar eq), which is subsequently heated to 70° C. Then, Bismuth(neodecanoate) (0.01 wt %) is added and the diethyleneglycol (DEG), 0.5 molar eq. feed is started. The feeding rate is set in such a manner that the temperature of the reaction mixture does not exceed 90° C. Typically, the DEG is added in a time window of 45 minutes. Afterwards, the reaction is left to stir for 30 minutes. Then, a second shot of Bismuth(neodecanoate) (0.01 wt %) and 2,6-Di-tert-butyl-4-methylphenol (0.01 wt %) is added and the 2-hydroxyethyl methacrylate (HEMA) feed (1 molar eq.) is started. Again, the feeding rate is set in such a manner that the reaction temperature does not exceed 90° C. After completion of the HEMA feed, the reaction is left to stir for 30 minutes. Finally, the reaction product is casted in an aluminum tray and left to cool to induce crystallization.

Longer oligomers will be formed as well because of the likely formation of (HDI-DEG)n in the first step. These longer oligomers are therefore comprised of the sequence HEMA-(HDI-DEG)n-HDI-HEMA. It is also expected that the formation of these oligomers will also result in the formation of the short urethane adduct HEMA-HDI-HEMA. This probably explains the multiple melting temperatures.

HHHm, HHHa and HPHm are formed as follows. A reactor vessel with stirring equipment is charged with diisocyanate (1 molar eq), which is subsequently heated to 70° C. Then, Bismuth(neodecanoate) (0.01 wt %) is added and the (meth)acrylate monomer (2 molar eq.) feed is started. Feeding rate is set in such a manner that the temperature of the reaction mixture does not exceed 90° C. Typically, the monomer is added in a time window of 60 minutes. Afterwards, the reaction is left to stir for 30 minutes. Then, a second shot of Bismuth(neodecanoate) is added the reaction is left to stir for another 60 minutes. Finally, the reaction product is casted in an aluminum tray and left to cool to induce crystallization. The diisocyante and meth(acrylate) monomer corresponding to each resin is as presented in Table 0.3.

TABLE 0.3

HHHm, HHHA, and HPHm Diisocyanate and (Meth)acrylate monomer:

| Resin: | Diisocyanate: | (meth)acrylate monomer: |
|---|---|---|
| HHHm | hexamethylene diisocyanate | HEMA |
| HHHa | hexamethylene diisocyanate | HEA |
| HPHm | pentamethylene diisocyanate | HEMA |

Method of Forming Particulate Compositions

The material is cooled to room temperature so that it forms a film. The film is broken into chips. The chips are milled in a IKA A11 mill and then sieved with a Retsch AS200. Materials which tend to stick during milling because of the temperature increase are first cooled in a freezer before milling. The sieve fraction with particle size below 200 µm is collected.

Method of Forming Liquid Compositions

The components of the liquid composition are thoroughly mixed at room temperature.

Method of Forming Films

In Example 4, films are prepared as follows. The particulate compositions are applied onto 0.8 mm thick chromate aluminum Q-panels (type ALQ-46). The Q-panel treated by treating the Q-panel with 1-STEP Frekote® mould release agent from Loctite and then drying in a Heraeus Instruments UT6120 oven at 130° C. for 15 minutes. This procedure is repeated twice more for a total of three times for each Q-panel to form a treated Q-panel.

After forming the particulate compositions and liquid compositions, films are prepared as follows. A Q-panel is held vertically in a fume hood. A layer of a particulate composition is sprayed on a Q-panel by a Wagner manual gun PEM-X1 combined with an EPG-Sprint X control unit at room temperature. Next, a quantity of the specified liquid composition is applied to the layer of the specified particulate composition by air brush gun (model: Iwata Eclipse HP-BCS bottom-feed airbrush). The Q-panel is placed in a vertical position and the liquid composition is sprayed onto the particulate composition from about 10 to 20 cm distance at room temperature. The weight of the panel is measured before and after spraying to determine the amount liquid composition applied. The wt % of liquid composition indicated in the following tables is the amount of liquid composition relative to the total amount of particulate composition and liquid composition on the Q-panel.

In Examples 5-8, films are prepared as follows. A polyethylene disc 6 cm in diameter with a 3 mm high ridge along its outer edge is taped to a glass plate to ensure that the disc is flat. About 5 g of particulate composition is deposited on the disc and the surface is flattened with a spatula. 2 to 3 g of liquid composition is deposited dropwise on the particulate composition by pipet.

In some cases, a sample is placed in an oven to simulate elevated temperatures in an exemplary additive fabrication process. In an exemplary additive fabrication process, at the time the liquid composition contacts the particulate composition, the temperature of the particulate composition and/or liquid composition is typically already near the temperature at which the first resin composition undergoes melting in absence of the liquid composition. Therefore, the length of time that the sample spends in the oven is not indicative of the time scale of an additive fabrication process UV Cure Conditions In the case that the experiment involves UV cure, the UV cure is performed as follows.

For Example 4, the panel is placed on a conveyor under a D-bulb set at 100% power output at the lowest height setting. The panel is subjected to five passes at 10.4 m/min under nitrogen blanket. The approximate UV output for one pass as measured by a Powerpuck II is as follows in Table 0.4:

TABLE 0.4

UV Rig Output (one pass)

| UV Light Component | mJ/cm$^2$ | mW/cm$^2$ |
|---|---|---|
| UV A | 1419 | 4881 |
| UV B | 340 | 1304 |
| UV A2 (C) | 696 | 2630 |
| UV V | 1492 | 5204 |

For Examples 5-7, the glass plate is placed under a Fusion F3000 S rig containing an H-bulb UV-lamp. The intensity is shown in Table 0.5, as recorded by a Power Puck placed 12 cm from the bulb. The samples are irradiated for 1 minute.

TABLE 0.5

Example 5-7 Light Intensity

| Component | Intensity (W/cm$^2$) |
|---|---|
| UV-A | 0.336 |
| UV-B | 0.323 |
| UV-C | 0.058 |
| UV-V | 0.257 |
| Total Intensity | 0.974 |

Example 1—EFAMTD of HHHm Particulate Composition and HEMA Liquid Composition

Mixtures of HHHm and HEMA were measured according to the described protocol. The weight fractions of each composition and measured melting temperatures are given in Table 1. FIG. 1 shows the DSC results. Tm slope is determined according to equation (5). Since only one melting peak is measured, the EFAMTD is the same as the Tm slope. The EFAMTD is −46.7° C.

TABLE 1

| Wt fraction HHHm | Wt fraction HEMA | Tm (° C.) |
|---|---|---|
| 1 | 0 | 73.1 |
| 0.828 | 0.172 | 65.2 |
| 0.622 | 0.378 | 55.1 |

Example 2—EFAMTD of PE-U-ma Particulate Composition and HEMA Liquid Composition

Mixtures of PE-U-ma and HEMA were measured according to the described protocol. Since the endothermic part of the melting enthalpy minus the exothermic part of the melting enthalpy of the second heating run is less than 10% of the total melting enthalpy measured during the first heating run, new samples are first heated to 110° C. at 5° C./min, kept isothermal for 1 min, and cooled down to room temperature at 5° C./min. The samples are stored at room temperature for three days, after which the samples are measured by first cooling down to −70° C. and subsequently heating to 110° C. The melting points and enthalpies recorded during this heating run are used for the EFAMTD calculation.

Figure 2:
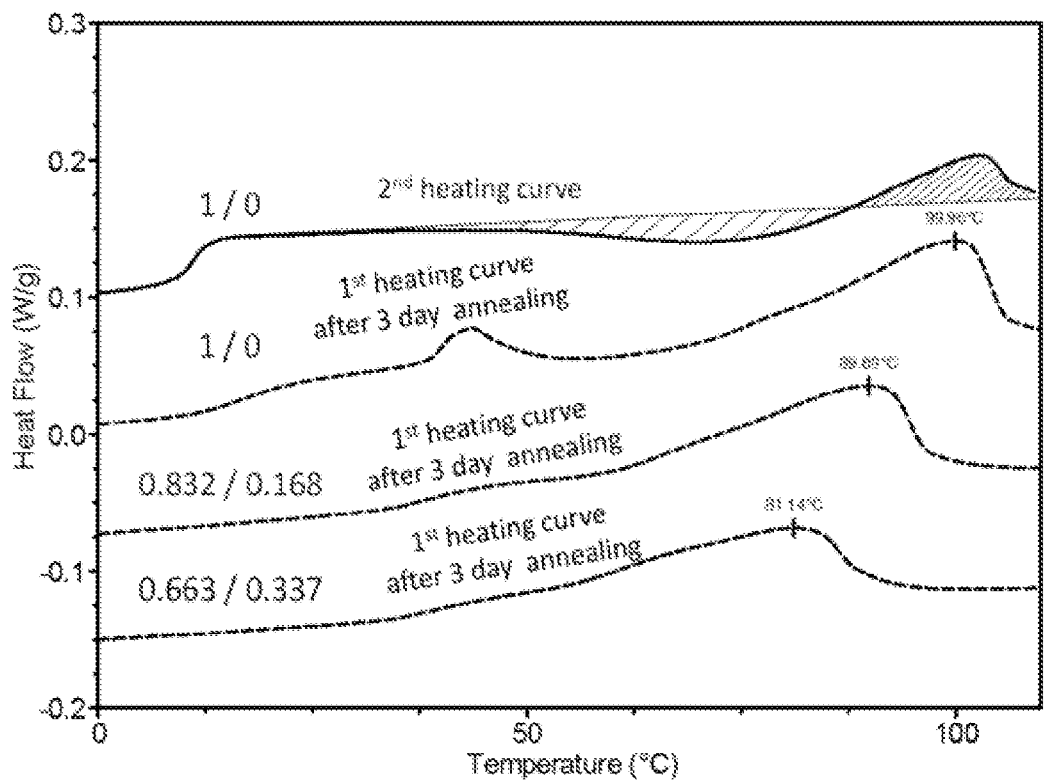
FIG. 2 is a graph of DSC results associated with Example 2.

The weight fractions of each composition and measured melting temperatures are given in Table 2. FIG. 2 shows the DSC results. Tm slope is determined according to equation (5). Since only one melting peak is measured, the EFAMTD is the same as the Tm slope. The EFAMTD is −57.9° C.

TABLE 2

| Wt Fraction PE-U-ma | Wt Fraction HEMA | Tm (° C.) |
|---|---|---|
| 0 | 0 | 100 |
| 0.832 | 0.168 | 89.9 |
| 0.663 | 0.337 | 81.1 |

Example 3—Further EFAMTD Calculations

The EFAMTD was determined for the following sets of particulate composition and liquid composition according to the protocol described above. The results are shown in Table 3.

TABLE 3

| Further EFAMTDs | | |
|---|---|---|
| Particulate Composition | Liquid Composition | EFAMTD |
| P1900 | HBVE | −52.1 |
| P1900 | DEGDVE | −35.1 |
| P1900 | CHMDVE | −24.1 |
| P1900 | HEMA | −40.6 |
| HPHm | HEMA | −46.6 |
| HHHm | PEG600dMA | −17.0 |
| HHHa | HEA | −59.6 |
| HHHa | H2O/HEA (50/50) | −91.2 |
| HHHa | water | −64.2 |
| HHHa | ethanol | −97.7 |
| HHHa | Neorad-U60 | −6.7 |

Example 4—HHHm Particulate Composition/HEMA Liquid Composition Film

A particulate composition consisting of HHHm (EFAMTD is −46.7° C. as in Example 1) is applied to a Q-panel. The weight of the powder is approximately 1177 mg. 75% of the area (approximately 883 mg) of the Q-panel is then sprayed at room temperature with an airbrush with 415 mg of a liquid composition consisting of 30 parts HEMA and 1 part BAPO. After spraying, 68 wt % is particulate composition and 32 wt % is liquid composition. The panel is placed on a heat-sink of 70° C. After 3 minutes the sprayed powder is molten. The panel is UV-cured at 70° C. After the UV-cure the weight loss is measured to be 0.2%.

A fully clear film is obtained at the area were the liquid was sprayed while the other unsprayed 25% of the area is still a powder. With FT-IR no residual methacrylate groups are found. The film is removed and subjected to DMTA. Results are shown in Table 4.

A second run is performed, but with the oven temperature set to 76° C. Now, both the particulate composition that was in contact and not in contact with the liquid composition melted.

TABLE 4

| | Example 4 DMTA Results | | | | | |
|---|---|---|---|---|---|---|
| System | E' T = −40° C. (MPa) | E' T = 23° C. (MPa) | E' T = 150° C. (MPa) | Tg1 E"max (° C.) | Tg2 E"max (° C.) | tan δ max (° C.) |
| HHHm/HEMA | 4788 | 3213 | 33 | −84 | 57 | 128 |

Example 5—Films Formed from a Liquid Composition that does not Comprise a Liquid Polymerizable Component The composition of the sample is shown in Table 5.1. Wt % is the wt % in the sample containing the combined particulate composition and liquid composition.

TABLE 5.1

| Experiment 5 Compositions | | | | | |
|---|---|---|---|---|---|
| Particulate Composition | | Liquid Composition | | | |
| Wt (g) | HHHa (wt %) | Wt (g) | EtOH (wt %) | BAPO (wt %) | Wt Ratio (Part/Liq) |
| 5.07 | 65 | 2.73 | 34 | 1 | 65/35 |

After pipetting the liquid composition, the sample is covered and placed in a convection oven at 70° C. for 13 minutes. The sample now visually appears homogeneous and clear due to melting. The sample is UV cured. The sample is subjected to the Acetone Spot Test and scores a '+'.

Figure 3:
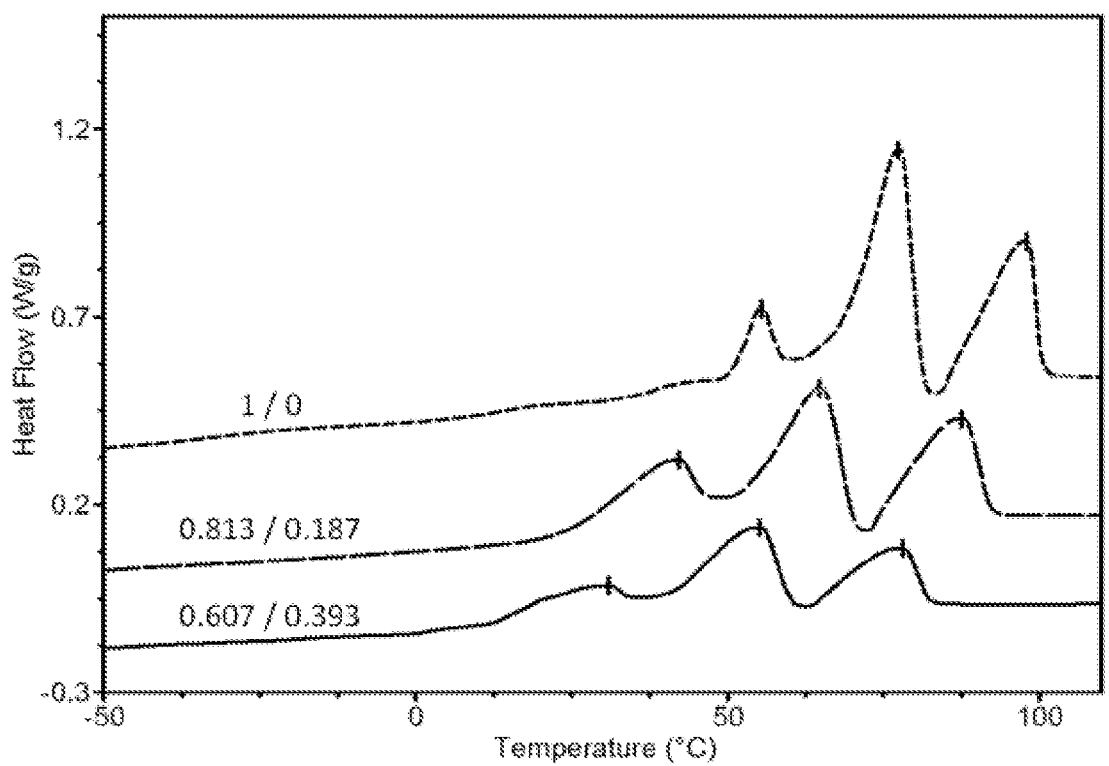
FIG. 3 is a graph of DSC results associated with Example 6.

Example 6—Films Formed from PU-DEG-Me Particulate Composition and HEMA Liquid Composition The melting temperatures, melting enthalpy associated with each melting temperature, and EFAMTD are first determined. Mixtures of PU-DEG-Me and HEMA are measured according to the described protocol. The weight fractions of each composition and the measured melting temperatures are shown in Table 2. The melting enthalpy associated with each melting temperature when the particulate composition is not in contact with the liquid composition are shown in Table 6.2. The DSC results are shown in FIG. 3.

TABLE 6.1

Example 6 Melting Temperatures of PU-DEG-Me/HEMA Samples

| Wt Fraction PU-DEG-Me | Wt Fraction HEMA | Tm 1 (° C.) | Tm 2 (° C.) | Tm 3 (° C.) |
|---|---|---|---|---|
| 1 | 0 | 55.5 | 77.4 | 97.9 |
| 0.813 | 0.187 | 42.2 | 64.3 | 87.4 |
| 0.607 | 0.393 | 30.9 | 55.1 | 78.1 |

TABLE 6.2

Example 6 Melting Enthalpy Associated with Each Melting Temperature

| Tm Name | Tm Value (° C.) | $\Delta H_m$ (J/g) |
|---|---|---|
| Tm 1 | 55.5 | 11.9 |
| Tm 2 | 77.4 | 36.9 |
| Tm 3 | 97.9 | 20.5 |

The Tm slope is determined according to equation (3). The Tm slope of the lowest set of melting temperatures is −66.9, the Tm slope of the middle set of melting temperatures is −63.4, and the Tm slope of the highest set of melting temperatures is −53.3. The EFAMTD is determined using equations (3) and (7) and is −61° C.

Next, the melting behavior of a PU-DEG-Me particulate composition in the absence of the liquid composition is studied.

The particulate composition is placed in an oven until the local temperature reaches the specified value. After cooling, the appearance is observed visually. The melting behavior is also based on visual observation. The results are shown in Table 6.3.

TABLE 6.3

Melting Behavior of PU-DEG-Me Particulate Compositions

| Exp. | Condition | Oven Temp. (° C.) | Appearance | Melting behavior |
|---|---|---|---|---|
| 6-1 | Oven Temp < Tm1 < Tm2 < Tm3 | 50 | No film formed | No melting |
| 6-2 | Tm1 < Oven Temp < Tm2 < Tm3 | 75 | No film formed | No melting |
| 6-3 | Tm1 < Tm2 < Oven Temp < Tm3 | 85 | Film not coherent | Starts melting, sticky |
| 6-4 | Tm1 < Tm2 < Tm3 < Oven Temp | 105 | Clear film | Full melting, liquid |

Next, the melting and cure behavior of PU-DEG-Me particulate compositions contacted with HEMA/BAPO liquid compositions are studied. Samples are formed on polyethylene discs according to the procedure described above. Each particulate composition is 100 wt % PU-DEG-Me, based on the total weight of the particulate composition. Each liquid composition is 97.5 wt % HEMA and 2.5 wt % BAPO, based on the total weight of the liquid composition. The weight ratio of PU-DEG-Me:HEMA:BAPO in the sample is 60:39:1, thus the weight ratio of particulate composition to liquid composition is 60:40.

After contacting the particulate composition with liquid composition, the sample is placed in a vacuum oven uncovered for 30 minutes to facilitate wetting and remove air. The glass plate holding each sample is then placed in a convection oven at the indicated temperature for the indicated time. The sample is then UV cured. The appearance is observed visually. The melting behavior is also based on visual observation. The results are shown in Table 6.4. Tm1, Tm2, and Tm3 refer to the depressed Tm at a wt fraction of HEMA of 0.393, as shown in Table 6.1.

TABLE 6.4

Cure Behavior of Samples of PU-DEG-Me Particulate Compositions and HEMA/BAPO Liquid Compositions

| Exp. | Condition | Oven Temp. (° C.,) | Oven Time (min) | Appearance | Melting behavior |
|---|---|---|---|---|---|
| 6-5 | Oven Temp < Tm1 < Tm2 < Tm3 | 30 | 20 | No film formed | No melting |
| 6-6 | Tm1 < Oven Temp < Tm2 < Tm3 | 40 | 20 | Clear Film | Partial initial melting, further melting during cure |
| 6-7 | Tm1 < Oven Temp < Tm2 < Tm3 | 50 | 20 | Clear Film | Melted |

TABLE 6.4-continued

Cure Behavior of Samples of PU-DEG-Me Particulate
Compositions and HEMA/BAPO Liquid Compositions

| Exp. | Condition | Oven Temp. (° C.,) | Oven Time (min) | Appearance | Melting behavior |
|---|---|---|---|---|---|
| 6-8 | Tm1 < Tm2 < Oven Temp < Tm3 | 70 | 15 | Clear Film | Melted |
| 6-9 | Tm1 < Tm2 < Tm3 < Oven Temp | 80 | 10 | Clear film | Full melting, liquid |

Exp. 6-6 is still not completely melted after being removed from the oven, with particles still being visible. During UV cure, the surface temperature is measured to be 55° C. The final cured sample is visually clear.

Exp. 6-7 is visually melted after being removed from the oven despite having an oven temp less than Tm2. The likely explanation for the melting behavior is the broadening of the melting peak of Tm2 as shown in FIG. 3. The particles may be incompletely melted, but may be so small or the refractive index so similar that they cannot be observed visually. Exp. 6-7 is additionally post-cured for 1 hour at 120° C. after UV cure. No visual changes are observed after post-cure.

Exp. 6-6, 6-7, 6-8, and 6-9 are subjected to the AST and receive a '+'.

Example 7—Effect of a Surfactant on the Melting and Cure Behavior of PU-DEG-Me Particulate Compositions Contacted with HEMA/BAPO Liquid Compositions Samples are formed on polyethylene discs according to the procedure described above. Each particulate composition is 100 wt % PU-DEG-Me, based on the total weight of the particulate composition. Each liquid composition is composed as described in Table 7.1, with the wt % being based on the total weight of the liquid composition. The weight ratio of particulate composition to liquid composition is 70:30.

TABLE 7.1

Example 7 Compositions

| | Liquid Composition | | | |
|---|---|---|---|---|
| Exp. | HEMA (wt %) | BAPO (wt %) | BYK A555 (wt %) | Wt Ratio (Part.:Liq.) |
| 7-1 | 97.5 | 2.5 | 0 | 70:30 |
| 7-2 | 96.3 | 3.3 | 0.33 | 70:30 |

Sample 7-1 is placed in a vacuum oven uncovered for 30 minutes to facilitate wetting and remove air. Sample 7-2 is not placed in a vacuum oven. The glass plate holding each sample is then placed in a convection oven at 80° C. for 10 minutes. The samples are then UV cured. Complete melting is observed in both samples and visually clear films are obtained. Both samples score a '+' in the AST.

In a further experiment, a 0.86 g liquid composition identical to Exp. 7-2 is pipetted onto a layer of 2 g of particulate composition consisting of 100 wt % PU-DEG-Me. The glass plate holding the sample is then placed in a convection oven at 80° C. for 10 minutes. The sample is then UV cured, thereby forming a cured layer. A second 2 g layer of particulate composition is then formed on top of the cured layer, 0.86 g liquid composition is again pipetted onto the cured layer, the sample is placed in the oven at 80° C. for 10 minutes, and then UV cured. The procedure is repeated once more, for a total of three cured layers. The 3-layer sample is visually clear, and the individual layers are not visible. This sample receives a '+' in the AST.

The one-layer and the three-layer film of Sample 7-2 are subjected to DMTA. The results are shown in Table 7.2, below.

TABLE 7.2

Sample 7-2 DMTA Results

| Layers | E' T = −40° C. (MPa) | E' T = 23° C. (MPa) | E' T = 150° C. (MPa) | Tg1 E"max (° C.) | Tg2 E"max (° C.) | tan δ max (° C.) |
|---|---|---|---|---|---|---|
| 1 | 3331 | 2519 | 19 | −82 | 55 | 92 |
| 3 | 4150 | 3094 | 19 | −84 | 56 | 90 |

Example 8—Thermally Initiated Cured Films

The particulate composition used in this experiment is formed as follows. 152.04 g of hexamethylene diisocyanate is added to a reactor vessel with stirring and heated to 70° C. 0.04 g of TIB cat 716 from TIB chemicals ((Bismuth (neodecanoate)) is then added. Over a period of 10 minutes, 47.96 g of diethylene glycol is added. During this feeding process the temperature is maintained at 90-92° C. After completion of the feed, the mixture is kept at 90-92° C. for 5 minutes. After 5 minutes 0.04 g of TIB cat 716 from TIB chemicals ((Bismuth(neodecanoate)) and 0.04 g of 2,6-Di-tert-butyl-4-methylphenol are added as a shot to the reaction mixture. 105.87 g of 2-hydroxyethyl methacrylate is then added slowly over a period of 40 minutes. During this feeding process the temperature is maintained at 90-92° C. After completion of the feed, 6.11 g of Trigonox® C from AkzoNobel is added as a shot to the reactor phase. After this addition, the mixture is stirred for another 5 minutes and cooled to room temperature. The material crystallizes upon cooling. The particulate composition is formed as described above.

Samples are formed on polyethylene discs according to the procedure described above.

Example 8-1: 5.0 g of particulate composition is deposited. 3.35 g of a liquid composition of 98.8 wt % ACMO with 1.2 wt % BYK A-555 is pipetted onto the particulate composition. The sample is placed in a convection oven at 65° C. for 1 hour. The material is clear, sticky and rubbery at 65° C. where the liquid composition was deposited, indicating melting and curing. The powder that is not in contact with the liquid composition remains powdery at the same temperature. The cured sample is subjected to a thermal post cure at 90° C. for 30 minutes and then at 120° C. for one hour. After post cure, a non-sticky, yellow, and visually clear film is obtained. This sample receives a '+' in the AST.

Example 8-2: 5.0 g of particulate composition is deposited. 3.35 g of a liquid composition of 98.8 wt % ACMO with 1.2 wt % BYK A-555 and 0.014 wt % cobalt stearate is pipetted onto the particulate composition. The sample is placed in a convection oven at 65° C. for 1 hour. The material is clear, sticky, and rubbery at 65° C. where the liquid composition was deposited, indicating melting and curing. The powder that is not in contact with the liquid composition remains powdery at the same temperature. The cured sample is subjected to a thermal post cure at 90° C. for 30 minutes and then at 120° C. for one hour. After post cure, a non-sticky, yellow, and visually clear film is obtained. This sample receives a '+' in the AST.

Additional Description of Exemplary Embodiments

1) A method of forming a three-dimensional object comprising the steps of:
   a. forming a layer of a particulate composition, the particulate composition comprising a plurality of first particles that comprise a resin component, the resin component comprising a first resin that is crystalline or semi-crystalline, the first resin comprising a first resin polymerizable group, wherein the layer of particulate composition has a dry temperature, the dry temperature being the temperature at the surface of the layer of the particulate composition;
   b. selectively depositing a liquid composition onto the layer of the particulate composition in accordance with computer data corresponding to the shape of at least a portion of a three-dimensional object, wherein at least one of the particulate composition or the liquid composition comprises an initiator capable of initiating the polymerization of at least the first resin, and wherein at least one melting temperature of the first resin is less when the particulate composition is in contact with the liquid composition than when the particulate composition is not in contact with the liquid composition;
   c. applying electromagnetic radiation to a plurality of the locations of the layer of the particulate composition where the liquid composition has been selectively deposited, wherein the particulate composition undergoes melting in a plurality of the locations where the liquid composition has been selectively deposited and while undergoing melting or while molten the initiator initiates polymerization of at least the first resin; and
   d. repeating steps a-c a plurality of times to form a three-dimensional object.

2) The method of any one of the preceding exemplary embodiments, wherein at least the first resin, the resin component, all crystalline or semi-crystalline resins in the particulate composition, all resins in the particulate composition, the first particles, or the particulate composition in the layer of particulate composition undergoes melting in a plurality of the locations where the liquid composition is selectively deposited prior to forming the next layer of particulate composition.

3) The method of any one of the preceding exemplary embodiments, wherein the first resin, the resin component, the first particles, all resins in the particulate composition, or the particulate composition undergoes melting at or below the dry temperature when the particulate composition is in contact with the liquid composition.

4) A kit of materials for forming an object by an additive fabrication process comprising:
   a. a particulate composition comprising a plurality of first particles that comprise a resin component, the resin component comprising a first resin that is crystalline or semi-crystalline, the first resin comprising a first resin polymerizable group; and
   b. a liquid composition;
   wherein at at least one temperature, the first resin, the resin component, all crystalline or semi-crystalline resins in the particulate composition, all resins in the particulate composition, the first particles, or the particulate composition do not undergo melting in absence of the liquid composition, but do undergo melting when the particulate composition is in contact with the liquid composition, and
   wherein at least one of the particulate composition or the liquid composition comprises an initiator capable of initiating the polymerization of at least the first resin.

5) The method or kit according to any one of the previous exemplary embodiments, wherein at least one melting temperature of the first resin, the resin component, the first particles, or the particulate composition is less when the particulate composition is in contact with the liquid composition than when the particulate composition is not in contact with the liquid composition.

6) The method or kit according to any one of the previous exemplary embodiments, wherein all melting temperatures of the first resin, the resin component, the first particles, all crystalline or semi-crystalline resins in the particulate composition, all resins in the particulate composition, or the particulate composition are less when the particulate composition is in contact with the liquid composition than when the particulate composition is not in contact with the liquid composition.

7) The method according to any one of the preceding exemplary embodiments, wherein electromagnetic radiation is applied to substantially all locations of the layer of the particulate composition where the liquid composition has been selectively deposited.

8) The method according to any one of the preceding exemplary embodiments, wherein electromagnetic radiation is applied to all locations of the layer of the particulate composition where the liquid composition has been selectively deposited.

9) The method or kit according to any one of the preceding exemplary embodiments, wherein the first resin, the resin component, all crystalline or semi-crystalline resins in the particulate composition, all resins in the particulate composition, the first particles, or the particulate composition undergoes an enthalpy fraction averaged melting temperature depression of at least 10° C. when contacted with the liquid composition.

10) The method according to any one of the preceding exemplary embodiments, wherein the dry temperature is such that the first resin, resin component, first particles, all crystalline or semi-crystalline resins in the particulate composition, all resins in the particulate composition, or the particulate composition undergoes melting after the liquid composition contacts the particulate composition, but the particulate composition does not melt in the absence of the liquid composition.

11) The method according to any one of the preceding exemplary embodiments, wherein when the liquid composition is in contact with the particulate composition the first resin, the resin component, the first particles, all crystalline or semi-crystalline resins in the particulate composition, all resins in the particulate composition, or the particulate composition undergoes melting at or below the dry temperature, but when the particulate composition is not in contact with the liquid composition the first resin, resin component, first particles, all resins in the particulate composition does not undergo melting at the dry temperature.

12) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points in the first resin that are greater than the local temperature divided by the total enthalpy of the melting points in the first resin that are less than or equal to the local temperature is less than 1.

13) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points in the first resin that are greater than the local temperature divided by the total enthalpy of the melting points in the first resin that are less than or equal to the local temperature is less than 0.75, less than 0.5, less than 0.25, less than 0.1, or 0.

14) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points in the resin component that are greater than the local temperature divided by the total enthalpy of the melting points in the resin component that are less than or equal to the local temperature is less than 1, less than 0.75, less than 0.5, less than 0.25, less than 0.1, or 0.

15) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points in the first particles that are greater than the local temperature divided by the total enthalpy of the melting points in the first particles that are less than or equal to the local temperature is less than 1, less than 0.75, less than 0.5, less than 0.25, less than 0.1, or 0.

16) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points that are greater than the local temperature in all crystalline or semi-crystalline resins in the particulate composition divided by the total enthalpy of the melting points that are less than or equal to the local temperature in all crystalline or semi-crystalline resins in the particulate composition is less than 1, less than 0.75, less than 0.5, less than 0.25, less than 0.1, or 0.

17) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points that are greater than the local temperature in all resins in the particulate composition divided by the total enthalpy of the melting points that are less than or equal to the local temperature in all resins in the particulate composition is less than 1, less than 0.75, less than 0.5, less than 0.25, less than 0.1, or 0.

18) The method or kit according to any one of the preceding exemplary embodiments, wherein "the particulate composition undergoes melting", as well as "undergo melting", "undergoing melting", and like terms, are defined as that the local temperature has at least temporarily reached the point where the total enthalpy of the melting points in the particulate composition that are greater than the local temperature divided by the total enthalpy of the melting points in the particulate composition that are less than or equal to the local temperature is less than 1, less than 0.75, less than 0.5, less than 0.25, less than 0.1, or 0.

19) The method of any one of the preceding exemplary embodiments, wherein the electromagnetic energy is applied selectively.

20) The method of any one of the preceding exemplary embodiments, wherein the electromagnetic energy is not applied selectively.

21) The method of any one of the preceding exemplary embodiments, wherein the electromagnetic radiation comprises infrared light and/or UV light.

22) The method of any one of the preceding exemplary embodiments, wherein the
electromagnetic radiation having a wavelength of from 340 to 460 nm, and/or
electromagnetic radiation having a wavelength of from 700 to 1500 nm.

23) The method or kit according to any one of the preceding exemplary embodiments, wherein the liquid composition comprises an absorber that absorbs electromagnetic radiation.

24) The method according to any one of the preceding exemplary embodiments, wherein the first resin, the resin component, the first particles, in all crystalline or semi-crystalline resins in the particulate composition, all resins in the particulate composition, or the particulate composition does not melt after being contacted with the liquid composition, and step c causes the first resin, the resin component, the first particles, all crystalline or semi-crystalline resins in the particulate composition, all resins in the particulate composition, or the particulate composition, to undergo melting in a plurality of locations where the liquid composition was selectively deposited.

25) The method according to any one of the preceding exemplary embodiments, wherein a plurality of the locations where the liquid composition is selectively deposited have a temperature that is at least temporarily higher than the dry temperature during or after performing step c.

26) The method according to any one of the preceding exemplary embodiments, wherein the local temperature at the surface of the layer at a plurality of the locations of the surface where the particulate composition is in contact with the liquid composition is greater than the lowest melting temperature of the first resin, the resin component, all crystalline or semi-crystalline resins in the particulate composition, all resins in the particulate composition, the first particles, or the particulate composition when the particulate composition is in contact with the liquid composition, and the local temperature at the surface of the particulate composition at the locations of the surface where the particulate composition is not in contact with the liquid composition is less than the lowest melting temperature of the first resin, the resin component, all crystalline or semi-crystalline resins in the particulate composition, all resins in the particulate composition, the first particles, or the particulate composition when the particulate composition is not in contact with the liquid composition 27) The method according to any one of the preceding exemplary embodiments, wherein the local temperature at the surface of the layer at the a plurality of locations of the surface where the particulate composition is in contact with the liquid composition is sufficient for the first resin, the resin component, all crystalline or semi-crystalline resins in the particulate composition, all resins in the particulate composition, the first particles, or the particulate composition to undergo melting when the particulate composition is in contact with the liquid composition, and the local temperature at the surface of the particulate composition at the locations of the surface where the particulate composition is not in contact with the liquid composition is not sufficient for the first resin, the resin component, all crystalline or semi-crystalline resins in the particulate composition, all resins in the particulate composition, the first particles, or the particulate composition to undergo melting when the particulate composition is not in contact with the liquid composition.

28) The method according to any one of the preceding exemplary embodiments, wherein the electromagnetic radiation activates the initiator.

29) The method according to any one of the preceding exemplary embodiments, wherein the electromagnetic radiation activates the initiator and the initiator is a photoinitiator and the electromagnetic radiation comprises UV light.

30) The method according to any one of the preceding exemplary embodiments, wherein the initiator is a photoinitiator and the electromagnetic radiation comprises visible light.

31) The method according to any one of the preceding exemplary embodiments, wherein the initiator is a thermal-initiator and the electromagnetic radiation comprises infrared light.

32) The method according to any one of the preceding exemplary embodiments, wherein the dry temperature is maintained at a temperature that is less than the lowest melting temperature of the first resin, the resin component, all crystalline or semi-crystalline resins in the particulate composition, all resins in the particulate composition, the first particles, or the particulate composition, when the particulate composition is not in contact with the liquid composition and greater than at least the lowest melting temperature of the first resin, the resin component, all crystalline or semi-crystalline resins in the particulate composition, all resins in the particulate composition, the first particles, or the particulate composition, when the particulate composition is in contact with the liquid composition.

33) The method according to any one of the preceding exemplary embodiments, wherein the dry temperature is maintained at a temperature that is less than the lowest temperature at which the first resin, the resin component, all crystalline or semi-crystalline resins in the particulate composition, all resins in the particulate composition, the first particles, or the particulate composition undergoes melting, when the particulate composition is not in contact with the liquid composition and greater than the lowest temperature at which the first resin, the resin component, all crystalline or semi-crystalline resins in the particulate composition, all resins in the particulate composition, the first particles, or the particulate composition undergoes melting, when the particulate composition is in contact with the liquid composition.

34) The method according to any one of the preceding exemplary embodiments, wherein the dry temperature is maintained at a temperature that is less the lowest melting temperature of the first resin, the resin component, all crystalline or semi-crystalline resins in the particulate composition, all resins in the particulate composition, the first particles, or the particulate composition, when the particulate composition is not in contact with the liquid composition and greater than at least the temperature at which the first resin, the resin component, all crystalline or semi-crystalline resins in the particulate composition, all resins in the particulate composition, the first particles, or the particulate composition undergoes melting, when the particulate composition is in contact with the liquid composition.

35) The method or kit according to any one of the preceding exemplary embodiments, wherein the particulate composition has less than two melting temperatures.

36) The method or kit according to any one of the preceding exemplary embodiments, wherein the particulate composition has two or more melting temperatures.

37) The method or kit according to any one of the preceding exemplary embodiments, wherein the first particles has less than two melting temperatures.

38) The method or kit according to any one of the preceding exemplary embodiments, wherein the first particles has two or more melting temperatures.

39) The method or kit according to any one of the preceding exemplary embodiments, wherein the resin component has less than two melting temperatures.

40) The method or kit according to any one of the preceding exemplary embodiments, wherein the resin component has two or more melting temperatures.

41) The method or kit according to any one of the preceding exemplary embodiments, wherein the first resin has less than two melting temperatures.

42) The method or kit according to any one of the preceding exemplary embodiments, wherein the first resin has two or more melting temperatures.

43) The method or kit according to any one of the preceding exemplary embodiments, wherein all resins in the resin component have less than two melting temperatures.

44) The method or kit according to any one of the preceding exemplary embodiments, wherein all resins in the first particles have less than two melting temperatures.

45) The method or kit according to any one of the preceding exemplary embodiments, wherein all resins in the particulate composition have less than two melting temperatures.

46) The method or kit according to any one of the preceding exemplary embodiments, wherein the liquid composition comprises water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol.

47) The method or kit according to any one of the preceding exemplary embodiments, wherein the liquid composition comprises i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, and ii) an initiator.

48) The method or kit according to any one of the preceding exemplary embodiments, wherein the liquid composition comprises i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, and ii) an absorber.

49) The method or kit according to any one of the preceding exemplary embodiments, wherein the liquid composition comprises i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, ii) an initiator, and iii) an absorber.

50) The method or kit according to any one of the preceding exemplary embodiments, wherein the liquid composition consists of i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, or a mixture thereof, and ii) an initiator.

51) The method or kit according to any one of the preceding exemplary embodiments, wherein the liquid composition consists of i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, or a mixture thereof, and ii) an absorber.

52) The method or kit according to any one of the preceding exemplary embodiments, wherein the liquid composition consists of i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, or a mixture thereof, ii) a photo-initiator, and iii) an absorber.

53) The method or kit according to any one of the preceding exemplary embodiments, wherein the liquid composition comprises a first liquid polymerizable component, and the first liquid polymerizable component comprises a first liquid polymerizable group.

54) The method or kit according to any one of the preceding exemplary embodiments, wherein the liquid composition comprises a first liquid polymerizable component, and the first liquid polymerizable component comprises a first liquid polymerizable group that is able to (co)polymerize with the first resin polymerizable group.

55) The method or kit according to any one of the preceding exemplary embodiments, wherein the liquid composition comprises a first liquid polymerizable component, and the first liquid polymerizable component comprises a first liquid polymerizable group that is able to (co)polymerize with the first resin polymerizable group, and wherein the particulate composition or the liquid composition comprises an initiator capable of initiating the (co)polymerization of at least the first resin and the first liquid polymerizable component.

56) The method or kit according to any one of the preceding exemplary embodiments, wherein the melting temperature of all resins in the particulate composition when the resins are not in contact with the liquid composition is at least 3° C., at least 5° C., at least 10° C., at least 15° C., at least 20° C., at least 25° C., at least 30° C., at least 35° C., at least 40° C., at least 45° C., or at least 50° C. higher than the melting temperature of the resins in the particulate composition when the resins are in contact with the liquid composition.

57) The method or kit according to any one of the preceding exemplary embodiments, wherein the particulate composition further comprises a second resin that is crystalline or semi-crystalline, the second resin comprising a second resin polymerizable group.

58) The method or kit according to any one of the preceding exemplary embodiments, wherein the particulate composition undergoes an enthalpy fraction averaged melting temperature depression of at least 10° C., at least 15° C., at least 20° C., at least 25° C., at least 30° C., at least 35° C., at least 40° C., at least 45° C., or at least 50° C. when contacted with the liquid composition.

59) The method or kit according to any one of the preceding exemplary embodiments, wherein the particulate composition undergoes an enthalpy fraction averaged melting temperature depression of at most 140° C., at most 120° C., or at most 110° C. when contacted with the liquid composition.

60) The method or kit according to any one of the preceding exemplary embodiments, wherein the first resin comprises a melting temperature ($T_m$) of at least 30, at least 40, at least 50, or at least 60° C.

61) The method or kit according to any one of the preceding exemplary embodiments, wherein all melting temperatures in the first resin are at least 30, at least 40, at least 50, or at least 60° C.

62) The method or kit according to any one of the preceding exemplary embodiments, wherein all melting temperatures in the resin component are at least 30, at least 40, at least 50, or at least 60° C.

63) The method or kit according to any one of the preceding exemplary embodiments, wherein all melting temperatures in the first particles are at least 30, at least 40, at least 50, or at least 60° C.

64) The method or kit according to any one of the preceding exemplary embodiments, wherein all melting temperatures in the particulate composition are at least 30, at least 40, at least 50, or at least 60° C.

65) The method or kit according to any one of the preceding exemplary embodiments, wherein all melting temperatures in the first resin are at most 250, at most 200, at most 180, at most 160, at most 140, at most 130, at most 120, or at most 110° C.

66) The method or kit according to any one of the preceding exemplary embodiments, wherein all melting temperatures in the resin component are at most 250, at most 200, at most 180, at most 160, at most 140, at most 130, at most 120, or at most 110° C.

67) The method or kit according to any one of the preceding exemplary embodiments, wherein all melting temperatures in the first particles are at most 250, at most 200, at most 180, at most 160, at most 140, at most 130, at most 120, or at most 110° C.

68) The method or kit according to any one of the preceding exemplary embodiments, wherein all melting temperatures in the particulate composition are at most 250, at most 200, at most 180, at most 160, at most 140, at most 130, at most 120, or at most 110° C.

69) The method according to any one of the preceding exemplary embodiments, further comprising the step of maintaining the dry temperature at a temperature that is less than lowest melting temperature of the first resin when the first resin is not in contact with the liquid composition and greater than at least the lowest melting temperature of the first resin when the first resin is in contact with the liquid composition.

70) The method according to any one of the preceding exemplary embodiments, further comprising the step of maintaining the dry temperature at a temperature that is less than the lowest melting temperature of all resins in the particulate composition when the particulate composition is not in contact with the liquid composition and greater than the lowest melting temperature of all resins in the particulate composition when the particulate composition is in contact with the liquid composition.

71) The method according to any one of the preceding exemplary embodiments, further comprising the step of maintaining the dry temperature at a temperature that is less than the lowest melting temperature of the particulate composition when the particulate composition is not in contact with the liquid composition and greater than the lowest melting temperature of the particulate composition when the particulate composition is in contact with the liquid composition.

72) The method according to any one of the preceding exemplary embodiments, wherein the liquid composition is selectively deposited at an amount of at least 1 wt %, at least 5 wt %, at least 10 wt %, at least 15 wt %, at least 20 wt %, at least 25 wt %, at least 30 wt %, at least 35 wt %, or at least 40 wt % of liquid composition per voxel, based on the total weight of the particulate composition and the liquid composition per voxel.

73) The method according to any one of the preceding exemplary embodiments, wherein the liquid composition is selectively deposited at an amount of at most 90 wt %, at most 80 wt %, at most 75 wt %, at most 70 wt %, at most 65 wt %, or at most 60 wt % of liquid composition per voxel, based on the total weight of the particulate composition and the liquid composition per voxel.

74) The method according to any one of the preceding exemplary embodiments, further comprising the step of cooling the three-dimensional object below the dry temperature prior to removing the three-dimensional object from the particulate composition.

75) The method according to any one of the preceding exemplary embodiments, further comprising the step of cooling the three-dimensional object below the lowest Tg of the first resin, the resin component, all crystalline or semi-crystalline resins in the particulate composition, all resins in the particulate composition, the first particles, or the particulate composition, prior to removing the three-dimensional object from the particulate composition.

76) The method according to any one of the preceding exemplary embodiments, further comprising the step of post-curing by applying electromagnetic radiation to the three-dimensional object.

77) The method according to any one of the preceding exemplary embodiments, further comprising the step of post-curing by applying electromagnetic radiation to the three-dimensional object, wherein the electromagnetic radiation comprises infrared radiation.

78) The method according to any one of the preceding exemplary embodiments, further comprising the step of post-curing by applying electromagnetic radiation to the three-dimensional object wherein the electromagnetic radiation comprises ultraviolet radiation.

79) The method according to any one of the preceding exemplary embodiments, further comprising the step of thermally post-curing the three-dimensional object at a temperature that is the dry temperature or higher.

80) The method according to any one of the preceding exemplary embodiments, further comprising the step of thermally post-curing the three-dimensional object at a temperature that is higher than the dry temperature but less than the highest melting temperature in the particulate composition.

81) The method according to any one of the preceding exemplary embodiments, further comprising the step of thermally post-curing the three-dimensional object at a temperature that is greater than or equal to the highest melting temperature in the particulate composition.

82) The method according to any one of the preceding exemplary embodiments, further comprising the step of thermally post-curing the three-dimensional object at a temperature that is higher than all melting temperatures of the first resin, all resins in the particulate composition, the first particles, or the particulate composition when the particulate composition is not in contact with the liquid composition.

83) The method according to any one of the preceding exemplary embodiments, further comprising the step of thermally post-curing the three-dimensional object at a temperature that is higher than the dry temperature and higher than at least one melting temperature of the first resin, the resin component, all crystalline or semi-crystalline resins in the particulate composition, all resins in the particulate composition, the first particles, or the particulate composition when the particulate composition is in contact with the liquid composition, the at least one melting temperature being higher than the dry temperature 84) The method according to any one of the preceding exemplary embodiments, further comprising the step of thermally post-curing the three-dimensional object at a temperature that is higher than the dry temperature and greater than or equal to the activation temperature of a thermal initiator.

85) The method according to any one of the preceding exemplary embodiments, further comprising the step of post-curing the three-dimensional object at a temperature that is higher than the lowest melting temperature of the first resin, the resin component, all crystalline or semi-crystalline resins in the particulate composition, all resins in the particulate composition, the first particles, or the particulate composition when the first resin is not in contact with the liquid composition.

86) The method according to any one of the preceding exemplary embodiments, further comprising the step of maintaining a dry temperature that is less than the lowest melting temperature of all resins in the particulate composition when the particulate composition is not in contact with the liquid composition,
  wherein the electromagnetic radiation is infrared radiation, and
  wherein the local temperature at the surface of the particulate composition at a plurality of the locations of the surface where the particulate composition is in contact with the liquid composition is at least temporarily greater than the lowest melting temperature of all resins in the particulate composition when the particulate composition is in contact with the liquid composition.

87) The method or kit according to any one of the preceding exemplary embodiments, wherein the particulate composition further comprises a second resin, and the second resin has a melting temperature ($T_m$) of at least 30, at least 40, at least 50, or at least 60° C.

88) The method or kit according to any one of the preceding exemplary embodiments, wherein the particulate composition further comprises a second resin, and the second resin has a melting temperature ($T_m$) of at most 250, at most 200, at most 180, at most 160, at most 140, at most 130, at most 120, or at most 110° C.

89) The method or kit according to any one of the preceding exemplary embodiments, wherein all components that comprise a polymerizable group in the particulate composition are resins that are crystalline or semi-crystalline.

90) The method or kit according to any one of the preceding exemplary embodiments, wherein all components that comprise a polymerizable group in the particulate composition have a melting temperature.

91) The method or kit according to any one of the preceding exemplary embodiments, wherein all components that comprise a polymerizable group in the particulate composition have a melting temperature ($T_m$) of at least 30, at least 40, at least 50, or at least 60° C.

92) The method or kit according to any one of the preceding exemplary embodiments, wherein all components that comprise a polymerizable group in the particulate composition have a melting temperature ($T_m$) of at most 250, at most 200, at most 180, at most 160, at most 140, at most 130, at most 120, or at most 110° C.

93) The method or kit according to any one of the preceding exemplary embodiments, wherein the first resin has a glass transition temperature ($T_g$) of at least −70, at least −50, at least −40, at least −35, at least −20, at least −10, at least 0, at least 10, or at least 20° C.

94) The method or kit according to any one of the preceding exemplary embodiments, wherein the first resin has a glass transition temperature ($T_g$) of at most 120, at most 110, at most 100, at most 90, at most 80, at most 75, at most 70, at most 60, or at most 50° C.

95) The method or kit according to any one of the preceding exemplary embodiments, wherein the resin component comprises one or more crystalline resins having a melting temperature of from 40 to 120° C.

96) The method or kit according to any one of the preceding exemplary embodiments, wherein the resin component comprises a crystalline vinyl ether having a melting temperature of at least 40° C.

97) The method or kit according to any one of the preceding exemplary embodiments, wherein the particulate composition comprises an amorphous resin that has a glass transition temperature ($T_g$) of at least 20, at least 25, at least 30, at least 40, at least 45, or at least 50° C.

98) The method or kit according to any one of the preceding exemplary embodiments, wherein the particulate composition comprises an amorphous resin that has a glass transition temperature ($T_g$) of at most 120, at most 110, at most 100, at most 90, at most 80, at most 75, at most 70, at most 65, or at most 60° C.

99) The method or kit according to any one of the preceding exemplary embodiments, wherein all components of the liquid composition do not have a melting temperature above 25° C.

100) The method or kit according to any one of the preceding exemplary embodiments, wherein all components of the liquid composition other than any initiators in the liquid composition do not have a melting temperature above 25° C.

101) The method or kit according to any one of the preceding exemplary embodiments, wherein all resins in the particulate composition have a Mn divided by the average number of polymerizable groups per molecule of less than 3000 g/mol.

102) The method or kit according to any one of the preceding exemplary embodiments, wherein all resins that comprise a polymerizable group in the particulate composition have a Mn divided by the average number of polymerizable groups per molecule of less than 3000 g/mol.

103) The method or kit according to any one of the preceding exemplary embodiments, wherein all components that comprise a polymerizable group in the liquid composition have a Mn of less than 1500 g/mol, less than 1200 g/mol, less than 1000 g/mol, less than 800 g/mol, less than 700 g/mol, less than 600 g/mol, less than 500 g/mol, less than 400 g/mol, or less than 300 g/mol.

104) The method or kit according to any one of the preceding exemplary embodiments, wherein all polymeric or oligomeric components in the liquid composition have a Mn of less than 800 g/mol, less than 700 g/mol, less than 600 g/mol, less than 500 g/mol, or less than 400 g/mol.

105) The method or kit according to any one of the preceding exemplary embodiments, wherein all non-polymeric and non-oligomeric components in the liquid composition have an average molecular weight of less than 800 g/mol, less than 700 g/mol, less than 600 g/mol, less than 500 g/mol, or less than 400 g/mol.

106) The method or kit according to any one of the preceding exemplary embodiments, wherein the initiator is a thermal radical initiator.

107) The method or kit according to any one of the preceding exemplary embodiments, wherein the particulate composition comprises a thermal radical initiator, and wherein the thermal radical initiator generates sufficient radicals to initiate polymerization of the first resin within two hours when the thermal radical initiator is exposed to a temperature greater than or equal to an activation temperature, and the activation temperature is greater than 30° C.

108) The method or kit according to any one of the preceding exemplary embodiments, wherein the particulate composition or the liquid composition further comprises a retardant, and wherein the retardant inhibits the onset of polymerization of the first resin polymerizable group or the first liquid polymerizable group in response to radicals generated by the initiator.

109) The method or kit according to any one of the preceding exemplary embodiments, wherein the particulate composition comprises a thermal radical initiator and a retardant.

110) The method or kit according to any one of the preceding exemplary embodiments, wherein the particulate composition comprises an initiator and a retardant, and the initiator and retardant are dissolved or dispersed in the resin component.

111) The method or kit according to any one of the preceding exemplary embodiments, wherein the first resin polymerizable group comprises a carbon-carbon double bond.

112) The method or kit according to any one of the preceding exemplary embodiments, wherein the first resin polymerizable group comprises a carbon-carbon double bond attached to an electron withdrawing group.

113) The method or kit according to any one of the preceding exemplary embodiments, wherein the liquid composition comprises a liquid radical initiator.

114) The method or kit according to any one of the preceding exemplary embodiments, wherein the liquid composition comprises a photo-initiator.

115) The method or kit according to any one of the preceding exemplary embodiments, wherein the first liquid polymerizable group comprises a carbon-carbon double bond.

116) The method or kit according to any one of the preceding exemplary embodiments, wherein the first liquid polymerizable group comprises a carbon-carbon double bond attached to an electron donating group.

117) The method or kit according to any one of the preceding exemplary embodiments, wherein the first liquid polymerizable group comprises a (meth)acrylate group.

118) The method or kit according to any one of the preceding exemplary embodiments, wherein the plurality of first particles have a mean particle diameter of from 10 to 100 μm as measured by laser diffraction in accordance with ISO13320 (2009).

119) The method or kit according to any one of the preceding exemplary embodiments, wherein the plurality of first particles have a mean particle diameter of from 30 to 80 μm as measured by laser diffraction in accordance with ISO13320 (2009).

120) The method or kit according to any one of the preceding exemplary embodiments, wherein the particulate composition comprises a thermal radical initiator and the liquid composition further comprises an accelerator for the thermal radical initiator.

121) The method or kit according to any one of the preceding exemplary embodiments, wherein the liquid composition comprises a thermal radical initiator and the particulate composition further comprises an accelerator for the thermal radical initiator.

122) The method or kit according to any one of the preceding exemplary embodiments, wherein the particulate composition comprises a thermal radical initiator and the liquid composition further comprises an accelerator for the thermal radical initiator, and wherein when the accelerator comes in contact with the thermal radical initiator, the thermal radical initiator is able to generate radicals at a temperature that is lower than the temperature at which the thermal radical initiator is able to generate radicals in the absence of the accelerator.

123) The method or kit according to any one of the preceding exemplary embodiments, wherein the particulate composition comprises a thermal radical initiator and the liquid composition further comprises an accelerator for the thermal radical initiator, and wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at least 10° C.

124) The method or kit according to any one of the preceding exemplary embodiments, wherein the particulate composition comprises a thermal radical initiator and the liquid composition further comprises an accelerator for the thermal radical initiator, and wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 200° C.

125) The method or kit according to any one of the preceding exemplary embodiments, wherein the particulate composition comprises a thermal radical initiator and the liquid composition further comprises an accelerator for the thermal radical initiator, and wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 100° C.

126) The method or kit according to any one of the preceding exemplary embodiments, wherein the particulate composition comprises a thermal radical initiator and the liquid composition further comprises an accelerator for the thermal radical initiator, and wherein the temperature at which the thermal radical initiator has a half-life of 6 minutes or less when the thermal radical initiator is not in contact with the accelerator is 60° C. or higher and the temperature at which the thermal radical initiator has a half-life of 6 minutes or less when the thermal radical initiator is in contact with the accelerator is 50° C. or less.

127) The method or kit according to any one of the preceding exemplary embodiments, wherein the particulate composition comprises a thermal radical initiator and the liquid composition further comprises an accelerator for the thermal radical initiator, and wherein the temperature at which the thermal radical initiator has a half-life of 6 minutes or less when the thermal radical initiator is not in contact with the accelerator is 70° C. or higher and the temperature at which the thermal radical initiator has a half-life of 6 minutes or less when the thermal radical initiator is in contact with the accelerator is 40° C. or less.

128) The method or kit according to any one of the preceding exemplary embodiments, wherein the particulate composition comprises a thermal radical initiator and the liquid composition further comprises an accelerator for the thermal radical initiator, and wherein the temperature at which the thermal radical initiator has a half-life of 6 minutes or less when the thermal radical initiator is not in contact with the accelerator is 100° C. or higher and the temperature at which the thermal radical initiator has a half-life of 6 minutes or less when the thermal radical initiator is in contact with the accelerator is 50° C. or less.

129) The method or kit according to any one of the preceding exemplary embodiments, wherein the particulate composition comprises a thermal radical initiator and the liquid composition further comprises an accelerator for the thermal radical initiator, and wherein the temperature at which the thermal radical initiator has a half-life of 6 minutes or less when the thermal radical initiator is in contact with the accelerator is from 20° C. to 50° C.

130) The method or kit according to any one of the preceding exemplary embodiments, wherein the first resin polymerizable group comprises an acrylate, methacrylate, fumarate, maleate, itaconate, citraconate, or mesaconate.

131) The method or kit according to any one of the preceding exemplary embodiments, wherein the first resin polymerizable group comprises a methacrylate, fumarate, maleate, or itaconate.

132) The method or kit according to any one of the preceding exemplary embodiments, wherein the first resin comprises a backbone, the backbone comprising the reaction product of a polyacid and a polyol.

133) The method or kit according to any one of the preceding exemplary embodiments, wherein the first resin comprises a backbone, the backbone comprising the reaction product of a polyacid and a polyol, and wherein the polyacid comprises terephthalic acid, isophthalic acid, or phthalic acid.

134) The method or kit according to any one of the preceding exemplary embodiments, wherein at least 20 mol %, at least 30 mol %, at least 40 mol %, at least 50 mol %, at least 60 mol %, at least 70 mol %, at least 75 mol %, at least 80 mol %, at least 85 mol %, at least 90 mol %, at least 95 mol %, at least 98 mol %, or 100 mol % of the backbone of the first resin comprises the reaction product of a polyacid and a polyol.

135) The method or kit according to any one of the preceding exemplary embodiments, wherein at least 20 mol %, at least 30 mol %, at least 40 mol %, at least 50 mol %, at least 60 mol %, at least 70 mol %, at least 75 mol %, at least 80 mol %, at least 85 mol %, at least 90 mol %, at least 95 mol %, at least 98 mol %, or 100 mol % of the backbone of the first resin comprises the reaction product of terephthalic acid and a polyol.

136) The method or kit according to any one of the preceding exemplary embodiments, wherein at most 100 mol %, at most 98 mol %, at most 95 mol %, at most 90 mol %, at most 80 mol %, at most 70 mol %, or at most 60 mol % of the backbone of the first resin comprises the reaction product of terephthalic acid and a polyol.

137) The method or kit according to any one of the preceding exemplary embodiments wherein the particulate composition comprises from 40 to 100 wt % of first particles.

138) The method or kit according to any one of the preceding exemplary embodiments wherein the particulate composition comprises from 50 to 99 wt % of first particles.

139) The method or kit according to any one of the preceding exemplary embodiments wherein the particulate composition further comprises a flow modifier, a non-reactive filler, a stabilizer, or a colorant.

140) The method or kit according to any one of the preceding exemplary embodiments, wherein the particulate composition further comprises from 1 to 50 wt % of an inorganic filler.

141) The method or kit according to any one of the preceding exemplary embodiments, wherein the particulate composition further comprises from 1 to 50 wt % of an organic filler.

142) The method or kit according to any one of the preceding exemplary embodiments, wherein the particulate composition further comprises from 1 to 50 wt % of a non-reactive filler.

143) The method or kit according to any one of the preceding exemplary embodiments, wherein the particulate composition further comprises from 1 to 50 wt % of a reactive inorganic filler.

144) The method or kit according to any one of the preceding exemplary embodiments, wherein all resins in the particulate composition have a Mn divided by the average number of polymerizable groups per molecule of less than 3000 g/mol.

145) The method or kit according to any one of the preceding exemplary embodiments, wherein the particulate composition further comprises from 1 to 50 wt % of a reactive organic filler and the organic filler has a Mn divided by the average number of polymerizable groups per molecule of greater than 3000 g/mol and all resins in the particulate composition have a Mn divided by the average number of polymerizable groups per molecule of less than 3000 g/mol.

146) The method or kit according to any one of the preceding exemplary embodiments, wherein the average number of first resin polymerizable groups is at least 1, at least 1.5, at least 2, equal to 2, at least 2.01, at least 2.05, at least 2.10, at least 2.12, at least 2.15, at least 2.20, at least 2.30, at least 2.35, or at least 2.40.

147) The method or kit according to any one of the preceding exemplary embodiments, wherein the average number of first resin polymerizable groups is at most 10, at most 9, at most 8, at most 7, at most 6, at most 5, at most 5.5, at most 5, at most 4.5, at most 4, at most 3.80, or at most 3.50.

148) The method or kit according to any one of the preceding exemplary embodiments, wherein the first resin is telechelic.

149) The method or kit according to any one of the preceding exemplary embodiments, wherein the first resin is telechelic and comprises at least two first resin polymerizable groups as endgroups.

150) The method or kit according to any one of the preceding exemplary embodiments, wherein the first resin is telechelic and comprises from 2 to 3 first resin polymerizable groups as endgroups.

151) The method or kit according to any one of the preceding exemplary embodiments, wherein the first resin is telechelic and comprises at least two first resin polymerizable groups as endgroups, and the first resin polymerizable groups comprise a (meth)acrylate group.

152) The method or kit according to any one of the preceding exemplary embodiments, wherein the first resin is telechelic and comprises at least two first resin polymerizable groups as endgroups, and the first resin polymerizable groups comprise a vinyl ether, vinyl ester, vinyl amine, or vinyl amide group.

153) The method or kit according to any one of the preceding exemplary embodiments, wherein the first resin has a Mn of at least 800, at least 1000, at least 1500, at least 1800, at least 2000, or at least 2300 Da.

154) The method or kit according to any one of the preceding exemplary embodiments, wherein the first resin has a Mn of at most 20000, at most 10000, at most 9000, at most 8000, at most 7000, at most 6000, or at most 5000 Da. In an embodiment, the first resin has a Mn of at least 2000 and at most 8000 Da.

155) The method or kit according to any one of the preceding exemplary embodiments, wherein the $M_n$ of the resin component divided by the average number of polymerizable groups in each molecule of the resin component is at least 150, at least 180, at least 200, at least 250, at least 300, at least 350, at least 400, at least 450, or at least 500 g/mol.

156) The method or kit according to any one of the preceding exemplary embodiments, wherein the $M_n$ of the resin component divided by the average number of polymerizable groups in each molecule of the resin component is at most 3000, at most 2000, at most 1500, at most 1300, at most 1200, at most 1100, at most 1000, at most 900, at most 850, at most 800 g/mol.

157) The method or kit according to any one of the preceding exemplary embodiments, wherein the resin component further comprises a second resin, the second resin comprising a second resin polymerizable group.

158) The method or kit according to any one of the preceding exemplary embodiments, wherein the resin component further comprises a second resin, the second resin comprising a second resin polymerizable group, the second resin polymerizable group comprising a carbon-carbon double bond directly attached to an electron donating group.

159) The method or kit according to any one of the preceding exemplary embodiments, wherein the resin component comprises a crystalline or semi-crystalline resin comprising a carbon-carbon double bond directly attached to an electron donating group and an amorphous resin comprising a carbon-carbon double bond directly attached to an electron withdrawing group.

160) The method or kit according to any one of the preceding exemplary embodiments, wherein the particulate composition or resin component comprises a second resin polymerizable group and wherein the second resin polymerizable group comprises a vinyl ether.

161) The method or kit according to any one of the preceding exemplary embodiments, wherein the particulate composition or resin component comprises a second resin and wherein the second resin comprises a mono vinyl ether.

162) The method or kit according to any one of the preceding exemplary embodiments, wherein the particulate composition or resin component comprises a second resin and the second resin comprises a di vinyl ether.

163) The method or kit according to any one of the preceding exemplary embodiments, wherein the resin component comprises one or more resins having a number average molecular weight ($M_n$) of from 1000 to 5000 g/mol.

164) The method or kit according to any one of the preceding exemplary embodiments, wherein the first liquid polymerizable group comprises an acrylate group, a methacrylate group, or a carbon-carbon double bond directly attached to an electron donating group.

165) The method or kit according to any one of the preceding exemplary embodiments, wherein the first liquid polymerizable group comprises a vinyl ether, vinyl ester, vinyl amine, or vinyl amide.

166) The method or kit according to any one of the preceding exemplary embodiments, wherein the first liquid polymerizable group comprises a vinyl ether.

167) The method or kit according to any one of the preceding exemplary embodiments, wherein the liquid composition further comprises a second liquid polymerizable component, the second liquid polymerizable component comprising a second liquid polymerizable group.

168) The method or kit according to any one of the preceding exemplary embodiments, wherein the liquid composition further comprises a second liquid polymerizable component, the second liquid polymerizable component comprising a second liquid polymerizable group, the second liquid polymerizable group comprising a carbon-carbon double bond directly attached to an electron withdrawing group.

169) The method or kit according to any one of the preceding exemplary embodiments, wherein the second liquid polymerizable group is able to (co)polymerize with the first liquid polymerizable group.

170) The method or kit according to any one of the preceding exemplary embodiments, wherein the second liquid polymerizable group is able to (co)polymerize with the first resin polymerizable group and/or a second resin polymerizable group if present.

171) The method or kit according to any one of the preceding exemplary embodiments, wherein the first resin polymerizable group comprises a (meth)acrylate, and the first liquid polymerizable group comprises a (meth)acrylate.

172) The method or kit according to any one of the preceding exemplary embodiments, wherein the first resin comprises a polyester (meth)acrylate, the first resin polymerizable group comprises a (meth)acrylate, and the first liquid polymerizable group comprises a (meth)acrylate.

173) The method or kit according to any one of the preceding exemplary embodiments, wherein the first resin is a polyacrylate, polyurethane, epoxy, polyamide, polyesteramide, polycarbonate, polyurea, or a mixture or copolymer thereof.

174) The method or kit according to any one of the preceding exemplary embodiments, wherein the first resin is a polyester, polyurethane, polyamide, or a polyesteramide, or a mixture or copolymer thereof.

175) The method or kit according to any one of the preceding exemplary embodiments, wherein the first resin is an unsaturated polyester.

176) The method or kit according to any one of the preceding exemplary embodiments, wherein the first resin is a polyurethane.

177) The method or kit according to any one of the preceding exemplary embodiments, wherein the first resin is a polyurethane comprising a (meth)acrylate group.

178) The method or kit according to any one of the preceding exemplary embodiments, wherein the first resin comprises an unsaturated polyester and the first liquid polymerizable group is a vinyl ether.

179) The method or kit according to any one of the preceding exemplary embodiments, wherein the resin polymerizable group comprises an acrylate, the first liquid polymerizable group comprises a vinyl ether, the liquid composition comprises a second liquid polymerizable group, and the second liquid polymerizable group comprises a fumarate.

180) The method or kit according to any one of the preceding exemplary embodiments, wherein the resin component comprises a first resin and a second resin, the second resin comprising a second resin polymerizable group, the first resin comprising an unsaturated polyester, the second resin polymerizable group comprising a vinyl ether, and the first liquid polymerizable group comprising a vinyl ether.

181) The method or kit according to any one of the preceding exemplary embodiments, wherein the resin component comprises a first resin and a second resin, the second resin comprising a second resin polymerizable group, the first resin comprising an unsaturated polyester, the second resin polymerizable group comprising a vinyl ether, and the liquid composition comprising a second liquid polymerizable component comprising a second liquid polymerizable group, the first liquid polymerizable group comprising a vinyl ether and the second liquid polymerizable group comprising a fumarate.

182) The method or kit according to any one of the preceding exemplary embodiments, wherein the resin component comprises a first resin and a second resin, the second resin comprising a second resin polymerizable group, wherein the first resin is not able to copolymerize with the second resin.

183) The method or kit according to any one of the preceding exemplary embodiments, wherein the resin component comprises a first resin and a second resin, the second resin comprising a second resin polymerizable group, wherein the first resin is not able to copolymerize with the second resin, and wherein the second resin polymerizable group comprises an epoxy.

184) The method or kit according to any one of the preceding exemplary embodiments, wherein the resin component further comprises a second resin comprising a second resin polymerizable group, and wherein the first resin polymerizable group is a (meth)acrylate and the second resin polymerizable group comprises an epoxy.

185) The method or kit according to any one of the preceding exemplary embodiments, wherein the liquid composition comprises a second liquid polymerizable component comprising a second liquid polymerizable group, and the second liquid polymerizable group comprises an acrylate, methacrylate, fumarate, maleate, or itaconate.

186) The method or kit according to any one of the preceding exemplary embodiments, wherein the second liquid polymerizable group comprises a fumarate or itaconate.

187) The method or kit according to any one of the preceding exemplary embodiments, wherein the liquid composition further comprises a second liquid polymerizable component comprising a second liquid polymerizable group and the second liquid polymerizable group is not able to (co)polymerize with the first liquid polymerizable group.

188) The method or kit according to any one of the preceding exemplary embodiments, wherein the liquid composition further comprises a second liquid polymerizable component comprising a second liquid polymerizable group and the second liquid polymerizable group comprises an epoxy or an oxetane.

189) The method or kit according to any one of the preceding exemplary embodiments, wherein the initiator is a thermal radical initiator and comprises a peroxide.

190) The method or kit according to any one of the preceding exemplary embodiments, wherein the initiator is a thermal radical initiator and comprises a peranhydride, perester, perether, percarbonate, or hydroperoxide.

191) The method or kit according to any one the preceding exemplary embodiments, wherein the initiator is a thermal radical initiator and comprises a peranhydride, perester, or percarbonate.

192) The method or kit according to any one of the preceding exemplary embodiments, wherein the liquid composition further comprises an accelerator and the accelerator comprises an aromatic tertiary amine.

193) The method or kit according to any one of the preceding exemplary embodiments, wherein the liquid composition further comprises an accelerator and the accelerator comprises an N'N'dialkyl aromatic amine, an aromatic tertiary amine comprising an electron donating group directly attached to an aromatic ring, or an aromatic tertiary amine comprising a β-hydroxy alkyl attached to the tertiary amine.

194) The method or kit according to any one of the preceding exemplary embodiments, wherein the liquid composition further comprises an accelerator and the accelerator comprises diisopropanol-p-toluidine.

195) The method or kit according to any one of the preceding exemplary embodiments, wherein the particulate composition or liquid composition comprises a retardant and the retardant comprises a phenolic compound.

196) The method or kit according to any one of the preceding exemplary embodiments, wherein the particulate composition or liquid composition comprises a retardant and the retardant comprises 2-methyl hydroquinone or 2-t-butyl hydroquinone.

197) The method or kit according to any one the preceding exemplary embodiments, wherein the liquid composition further comprises a liquid radical initiator.

198) The method or kit according to any one of the preceding exemplary embodiments, wherein the liquid composition further comprises a liquid radical initiator and wherein the liquid radical initiator comprises a thermal radical initiator or a radical photo-initiator.

199) The method or kit according to any one of the preceding exemplary embodiments, wherein the liquid composition further comprises a liquid radical initiator and wherein the liquid radical initiator comprises a thermal radical initiator.

200) The method or kit according to any one of the preceding exemplary embodiments, wherein the liquid composition further comprises a liquid radical initiator and wherein the liquid radical initiator comprises a radical photo-initiator.

201) The method or kit according to any one of the preceding exemplary embodiments, wherein the plurality of first particles further comprise a non-reactive polymer having a number average molecular weight of 1000 to 20,000 g/mol.

202) The method or kit according to any one of the preceding exemplary embodiments, wherein the liquid composition further comprises an accelerator and wherein the accelerator comprises a transition metal catalyst.

203) The method or kit according to any one of the preceding exemplary embodiments, wherein the liquid composition further comprises an accelerator and wherein the transition metal catalyst comprises a transition metal salt or transition metal complex.

204) The method or kit according to any one of the preceding exemplary embodiments, wherein the liquid composition further comprises an accelerator comprising a transition metal catalyst and wherein the transition metal catalyst comprises Co, Mn, Cu, Fe, V, or Ti.

205) The method or kit according to any one of the preceding exemplary embodiments, wherein the liquid composition further comprises a plasticizer.

206) The method or kit according to any one of the preceding exemplary embodiments, wherein the liquid composition further comprises a plasticizer and the plasticizer comprises a polyalkylene ether.

207) The method of any one of the preceding exemplary embodiments, wherein the liquid composition is selectively dispensed onto the layer of the particulate composition in accordance with a plurality of voxels representing a portion of the three-dimensional object.

208) The method according to any one of the preceding exemplary embodiments, wherein the liquid composition is selectively dispensed onto the layer of the particulate composition in accordance with a plurality of voxels representing a portion of the three-dimensional object, and wherein the molar ratio of vinyl ether groups to fumarate and maleate groups per voxel is from 5:1 to 1:5.

209) The method according to any one of the preceding exemplary embodiments, wherein the liquid composition is selectively dispensed onto the layer of the particulate composition in accordance with a plurality of voxels representing a portion of the three-dimensional object, and wherein the molar ratio of vinyl ether groups to fumarate and maleate groups per voxel is from 1.5:1 to 1:1.5.

210) The method according to any one of the preceding exemplary embodiments, wherein the liquid composition is selectively dispensed onto the layer of the particulate composition in accordance with a plurality of voxels representing a portion of the three-dimensional object, and wherein the molar ratio of vinyl ether groups to fumarate and maleate groups per voxel is from 1.1:1 to 1:1.1.

211) The method according to any one of the preceding exemplary embodiments, wherein the liquid composition is selectively dispensed onto the layer of the particulate composition in accordance with a plurality of voxels representing a portion of the three-dimensional object, and wherein the molar ratio of methacrylate groups to vinyl ether groups to fumarate and maleate groups per voxel is from 4.5:2.5:1 to 3.5:1.5:1.

212) The method according to any one of the preceding exemplary embodiments, wherein the liquid composition is selectively dispensed onto the layer of the particulate composition in accordance with a plurality of voxels representing a portion of the three-dimensional object, and wherein the ratio of weight of the particulate composition to weight of the liquid composition per voxel is from 15:85 to 85:15 or from 30:70 to 70:30.

213) The method according to any one of the preceding exemplary embodiments, wherein the liquid composition is selectively dispensed onto the layer of the particulate composition in accordance with a plurality of voxels representing a portion of the three-dimensional object, and wherein the ratio of weight of the particulate composition to weight of the liquid composition per voxel is from 95:5 to 50:50.

214) The method or kit according to any one of the preceding exemplary embodiments, wherein the particulate composition or the liquid composition comprises a thermal radical initiator, and wherein the activation temperature of the thermal radical initiator is greater than 40° C.

215) The method or kit according to any one of the preceding exemplary embodiments, wherein the particulate composition or the liquid composition comprises a thermal radical initiator, wherein the activation temperature of the thermal radical initiator is greater than 50° C.

216) The method or kit according to any one of the preceding exemplary embodiments, wherein the particulate composition further comprises a plurality of second particles comprising a further resin component and devoid of a thermal radical initiator dispersed or dissolved in the further resin component, wherein the further resin component is the same or different than the resin component, and wherein the further resin component is able to (co)polymerize with the resin component.

217) The method or kit of any one of the preceding exemplary embodiments, wherein the particulate composition further comprises a plurality of second particles that comprise a further resin component that is different from the resin component and is not able to (co)polymerize with the resin component, and a further thermal initiator dispersed or dissolved in the further resin component for initiating polymerization of the further resin component.

218) The method or kit of any one of the preceding exemplary embodiments, wherein the particulate composition further comprises a plurality of second particles that comprise a further resin component that is different from the resin component and is not able to (co)polymerize with the resin component, and a further thermal initiator dispersed or dissolved in the further resin component for initiating polymerization of the further resin component.

219) The method or kit according to any one of the preceding exemplary embodiments, wherein the particulate composition further comprises an absorber.

220) The method or kit according to any one of the preceding exemplary embodiments, wherein the liquid composition further comprises an absorber.

221) The method or kit according to any one of the preceding exemplary embodiments, wherein the liquid composition comprises a surfactant.

222) The method or kit according to any one of the preceding exemplary embodiments, wherein the liquid composition comprises a block copolymer of i) silicone and ii)ethyleneoxide and/or propyleneoxide.

223) The method or kit according to any one of the preceding exemplary embodiments, wherein the liquid composition comprises a linear block copolymer comprising blocks of i) polydimethylsiloxane and ii) blocks of ethyleneoxide and/or blocks of propyleneoxide.

224) The method or kit according to any one of the preceding exemplary embodiments, wherein the liquid composition comprises a polymer comprising a polydimethylsiloxane backbone and pendant groups of blocks of ethyleneoxide and/or blocks of propyleneoxide.

225) The method or kit according to any one of the preceding exemplary embodiments, wherein the liquid composition comprises a pigment or a dye.

226) The method or kit according to any one of the preceding exemplary embodiments, wherein the particulate composition comprises a pigment or a dye.

227) The method of any one of the preceding exemplary embodiments, further comprising the step of selectively depositing an inhibitor on the particulate composition.

228) The method of any one of the preceding exemplary embodiments, further comprising the step of selectively depositing an inhibitor to the particulate composition, wherein the inhibitor is a retardant, a reflector, or a barrier.

229) A three-dimensional object formed from the method or kit of any one of the preceding embodiments.

230) A method of forming a three-dimensional object comprising the steps of
  a. forming a mold by the method of any one of the preceding embodiments, and
  b. using the mold to form a three-dimensional object.

231) A method of forming a three-dimensional object comprising the steps of
  a. providing a mold formed by the method of any one of the preceding embodiments, and
  b. using the mold to form a three-dimensional object.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. While certain optional features are described as embodiments of the invention, the description is meant to encompass and specifically disclose all combinations of these embodiments unless specifically indicated otherwise or physically impossible.

The invention claimed is:

1. A kit of materials for forming an object by an additive fabrication process comprising:
   a. a particulate composition comprising a plurality of first particles that comprise a resin component, the resin component comprising a first resin that is crystalline or semi-crystalline, the first resin comprising a first resin polymerizable group; and
   b. a liquid composition;
   wherein for at least one temperature, the first resin does not undergo melting in absence of the liquid composition, but does undergo melting when the particulate composition is in contact with the liquid composition, and
   wherein at least one of the particulate composition or the liquid composition comprises an initiator capable of initiating polymerization of at least the first resin when the liquid composition is in contact with the first resin; and
   wherein each resin in the particulate composition has a Mn divided by the average number of polymerizable groups per resin molecule of less than 3000 g/mol.

2. The kit according to claim 1, wherein the first resin undergoes an enthalpy fraction averaged melting temperature depression of at least 10° C. when contacted with the liquid composition.

3. The kit according to claim 1, wherein the liquid composition comprises i) water, methanol, ethanol, n-propanol, n-butanol, isopropanol, 1-methoxy-2-propanol, acetone, methyl ethyl ketone, cyclohexanone, methyl acetate, ethyl acetate, butyl acetate, ethylene glycol, or propylene glycol, and ii) the initiator.

4. The kit according to claim 1, wherein the liquid composition comprises a first liquid polymerizable component, and the first liquid polymerizable component comprises a first liquid polymerizable group that is able to (co)polymerize with the first resin polymerizable group.

5. The kit according to claim 4, wherein the first liquid polymerizable component has a Mn of less than 1500 g/mol, less than 1200 g/mol, less than 1000 g/mol, less than 800 g/mol, less than 700 g/mol, less than 600 g/mol, less than 500 g/mol, less than 400 g/mol, or less than 300 g/mol.

6. The kit according to claim 4, wherein the first resin comprises urethane acrylate or urethane methacrylate, and wherein the first liquid polymerizable component comprises an acrylate or a methacrylate.

7. The kit according to claim 4, wherein the first resin comprises a divinyl ether and wherein the first liquid polymerizable component comprises a vinyl ether or a methacrylate.

8. The kit according to claim 1, wherein the liquid composition comprises an absorber.

9. The kit according to claim 1, wherein the liquid composition further comprises a surfactant.

10. The kit according to claim 1, wherein the liquid composition further comprises a pigment or a dye.

11. The kit according to claim 1, wherein the first resin is telechelic and comprises two first resin polymerizable groups as endgroups, and the first resin polymerizable groups comprise a (meth)acrylate group.

12. The kit according to claim 1, wherein the first resin is a polyester, acrylic (polyacrylate), polyurethane, epoxy, polyamide, polyesteramide, polycarbonate, polyurea, or a mixture or copolymer thereof.

13. The kit according to claim 1, wherein the first resin is a polyester or a polyurethane.

14. The kit according to claim 1, wherein the first resin polymerizable group is in the backbone of the first resin and/or pendant to the backbone of the first resin and/or at the terminus of the first resin.

15. The kit according to claim 1, wherein the first resin polymerizable group comprises an acrylate, methacrylate, fumarate, maleate, itaconate, citraconate, or mesaconate.

16. The kit according to claim 1, wherein the initiator is configured to be activated by electromagnetic radiation.

17. The kit according to claim 16, wherein the initiator is a photo-initiator or a thermal initiator.

18. The kit according to claim 16, wherein the initiator is a thermal radical initiator with an activation temperature greater than 40° C.

19. The kit according to claim 1, wherein the liquid composition comprises a liquid radical initiator, wherein the liquid radical initiator is a thermal radical initiator with an activation temperature greater than 40° C., or a radical photo-initiator.

20. The kit according to claim 4, wherein the first resin comprises a urethane acrylate and wherein the first liquid polymerizable component comprises an acrylate, water, or ethanol.

* * * * *